(12) United States Patent
Leeming et al.

(10) Patent No.: US 12,097,424 B2
(45) Date of Patent: Sep. 24, 2024

(54) SYSTEM OF DISTRIBUTED INTERACTIVE OBJECTS

(71) Applicant: UNRULY STUDIOS, INC., Boston, MA (US)

(72) Inventors: Bryanne Leeming, Boston, MA (US); Daniel Ozick, Newton, MA (US); Amon Millner, Roslindale, MA (US); David Kunitz, Barrington, RI (US)

(73) Assignee: Unruly Studios, Inc., Boston, MA (US)

( * ) Notice: Subject to any disclaimer, the term of this patent is extended or adjusted under 35 U.S.C. 154(b) by 255 days.

(21) Appl. No.: 16/041,312

(22) Filed: Jul. 20, 2018

(65) Prior Publication Data

US 2019/0022520 A1    Jan. 24, 2019

Related U.S. Application Data

(60) Provisional application No. 62/535,573, filed on Jul. 21, 2017.

(51) Int. Cl.
| | |
|---|---|
| *A63F 13/214* | (2014.01) |
| *A63F 13/24* | (2014.01) |
| *A63F 13/28* | (2014.01) |
| *G06F 8/30* | (2018.01) |
| *G06F 8/34* | (2018.01) |
| *G06F 9/451* | (2018.01) |

(52) U.S. Cl.
CPC ............ *A63F 13/214* (2014.09); *A63F 13/24* (2014.09); *A63F 13/28* (2014.09); *G06F 8/315* (2013.01); *G06F 8/34* (2013.01); *G06F 9/451* (2018.02)

(58) Field of Classification Search
CPC ........ A63F 13/214; A63F 13/24; A63F 13/28; G06F 8/315; G06F 8/34; G06F 9/451
USPC ......................................................... 434/308
See application file for complete search history.

(56) References Cited

U.S. PATENT DOCUMENTS

| | | | |
|---|---|---|---|
| 5,971,761 A * | 10/1999 | Tillman, Sr. ............ | G09B 19/00 434/167 |
| 11,648,485 B2 * | 5/2023 | Blaustein ............. | A63H 17/395 446/431 |
| 2008/0039974 A1 * | 2/2008 | Sandin ................... | G05D 1/028 901/46 |
| 2010/0052253 A1 * | 3/2010 | Macura ..................... | A63F 9/24 273/237 |

(Continued)

*Primary Examiner* — Malina D. Blaise
(74) *Attorney, Agent, or Firm* — Wolf, Greenfield & Sacks, P.C.

(57) ABSTRACT

One or more programmable electronic interfaces made up of a tile, a sensor, or multiple tiles and/or sensors in a network communicate with a computational device to allow users to build programs to be played interactively on the interfaces. The interfaces can react to a user applying pressure to, contacting with the interface or otherwise triggering a sensor (such as motion, thermal, touch, pressure, or other detected interactions). The computational device provides a macro-scale interface of different types. The system communicates (either wirelessly or via a wired connection) with the computing device in order to send and receive information. The electronic interfaces can be tiles with interactive lights and/or sensors that can be programmed into games, designs, animations, light shows, musical instruments, dance routine steps, etc.

21 Claims, 42 Drawing Sheets

(56) References Cited

U.S. PATENT DOCUMENTS

| | | | | |
|---|---|---|---|---|
| 2010/0052866 | A1* | 3/2010 | Elferich | H05B 47/115 |
| | | | | 340/10.5 |
| 2013/0319137 | A1* | 12/2013 | Grau | G06F 3/04144 |
| | | | | 73/862.381 |
| 2015/0025690 | A1* | 1/2015 | Abuelsaad | H05K 7/20745 |
| | | | | 700/276 |
| 2015/0305663 | A1* | 10/2015 | Roots | A61B 5/168 |
| | | | | 600/595 |
| 2016/0287979 | A1* | 10/2016 | Akavia | A63H 33/42 |
| 2017/0007915 | A1* | 1/2017 | Moscatelli | G09B 19/00 |
| 2017/0135543 | A1* | 5/2017 | Halloran | A47L 9/0466 |
| 2018/0015363 | A1* | 1/2018 | Monnin | H04M 1/72403 |
| 2018/0071622 | A1* | 3/2018 | Xu | A63F 13/65 |
| 2018/0082601 | A1* | 3/2018 | Muir | G09B 19/22 |
| 2018/0101892 | A1* | 4/2018 | Pandey | G06F 16/29 |
| 2019/0227775 | A1* | 7/2019 | Kim | G09B 1/325 |
| 2020/0225767 | A1* | 7/2020 | Ben-Shalom | A63F 13/2145 |
| 2020/0259426 | A1* | 8/2020 | Rowe | F03G 7/0613 |
| 2022/0113692 | A1* | 4/2022 | McDougall | G05B 19/042 |
| 2022/0121294 | A1* | 4/2022 | Shem-Ur | A43B 3/48 |
| 2023/0196174 | A1* | 6/2023 | Cai | G06F 11/079 |
| | | | | 714/37 |
| 2023/0216508 | A1* | 7/2023 | Novellini | H03L 7/085 |
| | | | | 327/156 |
| 2023/0338666 | A1* | 10/2023 | Jugl | A61M 5/31568 |

* cited by examiner

SYSTEM OF DISTRIBUTED INTERACTIVE OBJECTS

STATEMENT REGARDING FEDERALLY SPONSORED RESEARCH OR DEVELOPMENT

N/A

BACKGROUND

Various embodiments relate generally to educational electronic interfaces and toys and related systems, methods, devices and computer programs and, more specifically, relate to an electronic, programmable, distributed interface made up of lights, sounds, and sensors and used for educational and entertainment purposes to support movement, games, animations, art, and musical programs through communication with a computational device.

This section is intended to provide a background or context. The description may include concepts that may be pursued but have not necessarily been previously conceived or pursued. Unless indicated otherwise, what is described in this section is not deemed prior art to the description and claims and is not admitted to be prior art by inclusion in this section.

Conventional interactive electronic interfaces take place on a normal computer or mobile device screen. There are electronic dance mats for gaming purposes, but none have ever been built to be user-programmable, to be used for educational purposes or to be spread out around a room.

Other electronic floor mats exist, but none have ever been built to be user-programmable or for educational purposes. Electronic light-up floors exist, but none have been built to be user-programmable, for educational purposes or to be wirelessly connected to a computing device and to each other. There exist projection touch-screen floors, but are not built to be user-programmable, for educational purposes or to spread far enough for physically active running games.

There are motion sensing video game systems, but none have been built to require lateral movements across the floor or to sense objects being thrown at the system, and none have been built to be user-programmable and none have been built that can track movements to a particular spot or to track calories burned or number of steps in a specific place, for example based on a formula for translating number of tiles presses to calories burned based on user biometric date, such as age, weight, etc. as well as on tile data, such as, location, distance apart, etc. and motion data, such as, whether the motion is running, jumping, walking, etc. This biometric data may be stored anonymously.

Conventional modular light up system are not built to be user-programmable by users or set up to an online sharing community of programs built by users and other third parties. Some miniature modular tiles act like computer screens, but none have been built durable enough to be stepped on or mounted to a wall for game play. There exist wireless buttons connected to smart devices, but none have been built to be meant for stepping and exercise. There are light up games for exercise and physical education, but none have been built to be user-programmable with games and programs shared between users and none have been connected wirelessly to a smart device and none have been built in a way that is low cost (so that homes and schools can afford them). There are also wireless wearable devices that are used for educational purposes, but none allow for specific locations to be user-programmed or games to be played over significant distances with multiple players.

Considering that the first electronic mat was created over twenty years ago, the fact that no user-programmable mats have been introduced since then shows that the typical electronic mat fails to meet this need.

BRIEF SUMMARY OF THE INVENTION

The below summary is merely representative and non-limiting.

The above problems are overcome, and other advantages may be realized, by the use of the embodiments.

In a first aspect, an embodiment provides a platform consisting of a programmable electronic interface (made up of one tile, one sensor object, or multiple tiles and/or sensors in a network) which communicates with a computational device to allow users to build programs to be played interactively on the interface by applying pressure to or contact with the interface or triggering a sensor (motion, thermal, or touch, pressure, or other sensor capabilities). It is a macro-scale interface for computing devices of different types. The system is connected to a power source of some kind, and communicates wirelessly (or wired) with the computing device sending and receiving information.

The electronic interfaces are interactive with lights and/or sensors that can be programmed into games, designs, animations, light shows, musical instruments, dance routine steps, and many more programs.

The electronic interface is either one large mat with modules inside it in a grid configuration or modular tiles and sensors that link together physically and/or electronically and can be programmed separately. The tiles may also be configured to have one tile and/or sensor to communicate with the computational device wirelessly, and the rest to link physically to that tile, but not to communicate amongst themselves. Each tile and/or sensor could also have lights and sensing capabilities as well as sound capabilities.

BRIEF DESCRIPTION OF THE SEVERAL VIEWS OF THE DRAWINGS

Aspects of the described embodiments are more evident in the following description, when read in conjunction with the attached Figures.

DETAILED DESCRIPTION OF THE INVENTION

Figure 1:
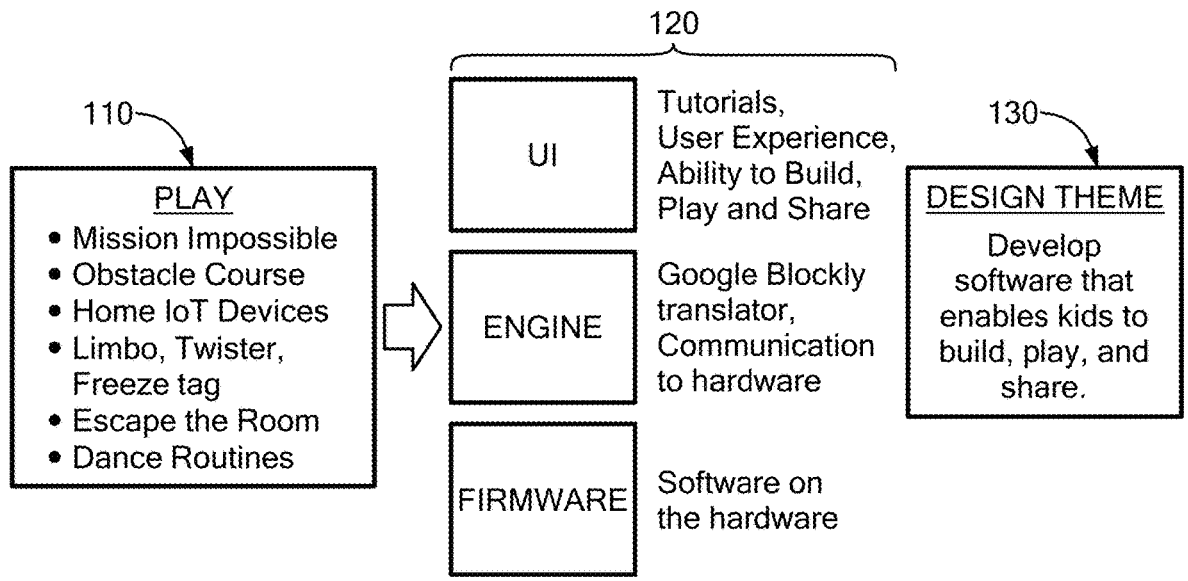
FIG. 1 illustrates a high concept view of various design aspects in accordance with an embodiment.

This patent application claims priority from U.S. Provisional Patent Application No. 62/535,573, filed Jul. 21, 2017, the disclosure of which is incorporated by reference herein in its entirety.

One embodiment is a set of modular tiles that link together mechanically and/or electronically and each have lighting, audio, and sensing capabilities as well as wireless connection to a device to be used to program the tiles (for example, to assign rules to the tiles using a kids programming interface). Objects such as tiles or sensors can be programmed using timers, changing light colors, sensing steps, sensing motion, sensing heat, sound, microphones, sensing pressure, sensing speed of steps or presses, flickering, logic added to create complex programs, and sending information back to the computational device.

Applications can be downloaded from online websites or mobile apps onto the hardware for new games and designs. The connection to the computational device can be any type suitable to the local technical environment and may be implemented using any suitable connection technology, such as Bluetooth or USB or WiFi-enabled, or wire-connected.

The power source can be plug into wall, battery-powered, wall charger (rechargeable), or using the kinetic energy of steps to recharge, solar energy to charge. The lights can either be NeoPixel programmable LEDs, a flexible LED surface, a digital screen, edge lighting on a tile, or any type of light source that can change colors. The sensors can either be mechanical, piezoelectric, pressure, bend, capacitive, or membrane switches, gyroscopes, springs, motion sensors, or other sensors.

Stepping on the tiles should feel like stepping on any normal floor surface, but a light and/or sound may be emitted. Tiles can be activated in many ways: stepping, pressing with hand or arms, sitting on, throwing an object at them against a wall, throwing an object at them when they're on the floor, and more. There is a threshold setting that can be modified to be able to sense anyone from a child to adult-sized person and possibly to identify different individuals.

Stepping on the tiles can produce light, or sound from an online library or recording. This may be part of a game or other program. Games on the tiles can be played by one or more people.

Any programming language can be used to assign rules and display outputs to the tiles, such as Scratch, or Google Blockly, Snap, PencilCode, or some other block-programming, visual language or a text language like Python or JavaScript, or a visual node language like NodeRed, voice-activated programming such as Amazon Alexa, Google Home, or other voice-activated systems that can connect wirelessly with the tiles or sensors.

Various embodiments provide a durable, programmable macro-interface for playing and learning for computing devices of different types. Users have the ability to easily program lights, sounds, and sensors with any connected device or method. The interface can use techniques to diffuse light in a wide, flat manner across the tile and/or individual lighting elements, such as a grid of LEDs.

Users have the ability to light the entire module or part of module in patterns or to show movement of light through module, such as for creating and executing light animations. The interface is designed to facilitate interaction between users and to encourage physical activity. The tiles are connected wirelessly, in a modular system and can be placed close together or far apart, or even in different spaces or rooms.

The tiles facilitate body movement by inspiring movement and travel of users between two separate tiles by being placed apart on the floor, as an interactive staircase, on steps, on a wall, or on any surface. Multiple tiles connect to a computing device at once and can be user-programmed by the same coding interface. In one, non-limiting embodiment, up to ten (10) tiles can be connected at once to one computing device and can be orchestrated to execute programs together as a system. In other embodiments, the number of tiles connected to a single computing device can be greater. The computing device may also be embodied as a single, independent device or as a combination of distributed devices, such as a client/server system.

The system of tiles can be programmed to sync to music and sounds from a device and to play sounds out of the tiles. The system can be a set of modular tiles or a large mat. The system is powered by a power source such as a battery, wall charger, multiple charging units, a wall plug-in, solar powered, or powered by kinetic energy. In other embodiments the power source can come from kinetic motion of use of the product.

The system can be programmed to be accessible to young learners and learners with disabilities. The tiles are programmed by end users and rules of game play can be changed, modified, and customized continuously by end users through a wirelessly connected mobile application or computing device. Use of the system facilitates social interaction in the real, non-digital world, social interaction in the digital world, collaboration, and physical activity by users.

The system may consist of programmable objects with surfaces connected wirelessly to a controller. The controller may provide an interface with a programming language designed for use by children, specifically a graphical interface such as a block-programming language.

Lights on the tiles can be any type of light including LEDs, RGB, RGB LEDs, NeoPixel LEDS, and other light sources such as light pipes and endlighting. Sensors on the tiles can be any type of sensor including capacitive sensors, pressure sensors, mechanical switches and sensors, weight sensors, bend sensors, piezoelectric sensors, and other ways of sensing movement, heat, weight, depression, sound, or other sensing capabilities.

Other embodiments of the system may include the ability to connect sensor system to publicly available data sources for additional inputs (such as weather data, or Twitter data, or music streaming) to be used as inputs or outputs for programs made by users to execute in the system and into the physical tiles and sensors.

The materials used for the object are chosen for durability and play and are a flexible, hard material with elements that are translucent to emit light. Tiles can be connected together through Bluetooth, Bluetooth Low Energy, WiFi, through a wire, through RFID beacons, through radio technology, or in other ways.

The coding interface consists of combination of open-source software and other software. The interface for coding for children consists of Google Blockly, block-programming languages, or text programming, or node programming, or any visual programming language, or voice-activated programming through Amazon Alexa or other voice-activated systems.

The tiles can have a built-in speaker or sound output capability as well as being able to provide sounds through a remote device. The connected device may be the controller, another tile or another connected device (e.g., a speaker).

Users have the ability to control software and gameplay through voice activation and commands or through communication with voice-activated systems (e.g., Amazon Alexa, Apple Siri, etc.). For example, users can ask for an update on a game, to switch modes, to switch games, or to customize game rules (changing lights, sounds, timing, or scoring) through voice commands. Through voice-activated conversation, users can also get help troubleshooting or tips on building their programs. Blocks in the coding language can be built to include voice-activated systems in the "if-then" structures of programs such as commanding the system to do something in response to code. Voice recording is possible as a programming output.

Users have the ability to code, program, manage, and change the system through voice commands.

Accessories can be connected to further enhance active play by fitting in with the tiles around the room. These accessories can be in the form of customized floor mats or puzzle mats, game balls, hoops for basketball games, steps to hold the tiles, a scoreboard to link to the game, or other related accessories.

A hole exists on the tiles giving users the ability to hang tiles on the wall. This also enables users to throw objects at the tiles to activate them. The holes may also be associated with detectors, such as a near-field communication sensor, RFID reader, optical sensor, etc., in order to detect the presence of the objects thrown.

The system facilitates spread out movement activities across a room or field. The range of the area may possibly span miles, for example, using cellular or internet connections between devices/controllers. One example is a video chat classroom setup with separate tiles located in each classroom.

The system promotes collaboration in the games and programs it allows for, both in coding objects, and in playing on the objects.

The system allows for voice recognition capability as a programming variable.

Programs, code, animations, data, and sounds can be either stored on the computing device application or stored locally on the tiles or sensors.

The system allows for networked games with video chat to enable collaborative and competitive play online from different towns or cities or countries.

The products and sensors can record activations as a step or press counter to record the number of activations of the product for end user or company use.

Additional uses for the programmable interface:
Educational settings (e.g., K-12, Informal Education, After-school programs, Corporate Training, Summer camps, etc.)
Library activities
Communication with light or sound across distances (e.g., Walkie Talkie type situations)
As a remote control for a SmartTV or other electronic devices
Therapy (e.g., Occupational therapy, Rehabilitation methods, Physical therapy, Therapy and treatment and ongoing work for children or adults with autism, etc.)
Events (interactive elements for events, Displays, Interactive experiences, etc.)
Toy (e.g., Pool toys, Bath toys, Toys for toddlers, etc.)
Athletic training
Karate or boxing training
ADHD/Learning Disability activities
Executive training
Adult learning
Leadership training
Leadership activities
Youth activities
Home school activity
Games (e.g., As a method of play, Wall game (mounted on wall), etc.)
Ceiling mounted, ceiling light
Artistic display (e.g., Art on the wall, Museum exhibit, Public art, Mood lighting, etc.)
Museum workshop or activity
Physical education classes and training
Competitions (e.g., Sporting events, etc.)
Exercise method
Estimation device for counting Example Embodiment of Unruly Splats:

One embodiment is a set of multiple electronic floor tiles that can light up in any color using programmable NeoPixel LEDs. The tiles can sense when they have been stepped on or pressed using switches at the four corners acting like microswitch buttons sensing across the entire tile, and can make sounds with a speaker on the tile. The tiles can either be placed near each other or spread apart for game play. They are powered by replaceable AA batteries below the tiles. They can act like wireless buttons that light up and make sound. They are connected wirelessly through Bluetooth to each other as well as to a central computing device (tablet, smartphone, laptop, desktop, video gaming console, smart TV, Amazon Alexa).

In order to control the game, the user downloads an app to the computing device. Through that computing device app, games can be chosen. The games may be run from the computing device and/or downloaded to the tiles for playing, and they can also be programmed with languages on the computer (children's block-programming like Scratch or any programming language) to add new games, designs, or music instruments to the tiles. These programs can be shared with others on a central website and downloaded to the floor tiles. The tiles can also be programmed to control the computer and to play games on the screen by using the tiles as buttons simulating keys on a keyboard. The app can be used to showcase new games, to provide a database of games to be downloaded and sent wirelessly to the tiles, and to host games played with the tiles with the computer screen output. The app can be used to count the number of steps activated on a given Splat.

Description of ScratchX (Scratch Extensions): These extensions allow you to create Scratch projects that connect with external hardware (such as electronic devices and robotics) and online resources (including web data and web services). Scratch is a free visual programming language. Scratch allows users to use event-driven programming with multiple active objects called sprites. Sprites can be drawn, as vector orbitmap graphics, in a simple editor that is part of Scratch, or can be imported from external sources, including webcams. In order to connect to physical objects, custom "blocks" can be created. These custom "blocks" are specific to the functions of the physical objects (if the object can light 14 LEDs, the block can assign rules to 14 LEDs etc.) These custom blocks can be used to simplify programming to communicate directly with physical objects skipping a lot of complex syntax.

The interactive tiles may be configured for user identification, for example, by determining who is stepping on the tile. This can be built into the game play but having the user select a specific tile color or tap a pattern. Alternatively, tiles may be assigned to a team. The determination may be made based on the user's weight (e.g., after standing still for 5 seconds), by detecting a color patch worn on a shoe or foot.

Other methods of identifying users may be used. The users may wear tri-color LEDs to interact with phototransistor(s) around the edge of the tile. Likewise, the user can wear a magnet which is detected by a Hall effect sensor. The polarity of the magnet can distinguished (e.g., N or S) and associated with a user or team. Combinations of RFID (or other NFC or passive NFC tags) and detectors may be used. The tag may be worn by the user and detected by the tile or the tile may include the tab and a user device (such as a smartphone) can be used to detect the tag. Lights (e.g., flashing patterns in the tile), sounds (e.g., specific tones or tunes) and voice recognition may also be used to identify the user/tile.

Figure 2:
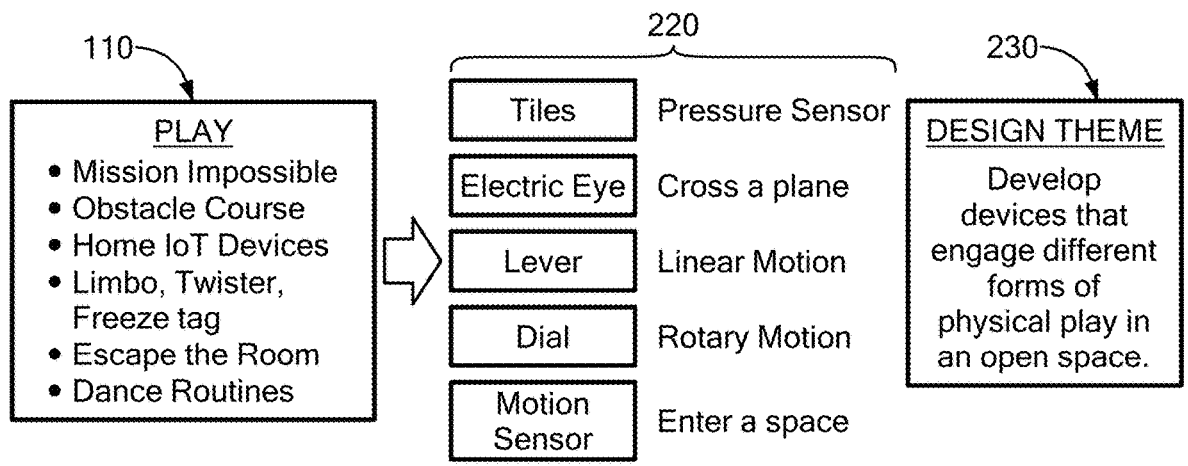
FIG. 2 illustrates a high concept view of various design aspects in accordance with another embodiment.

FIGS. 1 and 2 illustrate high concept views of various design aspects in accordance with some embodiments. FIG. 1 focuses on software features and FIG. 2 focuses on hardware features. A list of games 110 which are available for play is shown. The interface 120 includes a UI, software engines and firmware which can be used to implement the individual games. In FIG. 1, the design theme 130 is to help develop software that enables kids to build, play and share programs.

FIG. 2 details various interactive elements 220 which may be provided by a tile or another device. In FIG. 2, the design theme 230 is to help develop devices that engage different forms of physical play in an open space.

Figure 3:
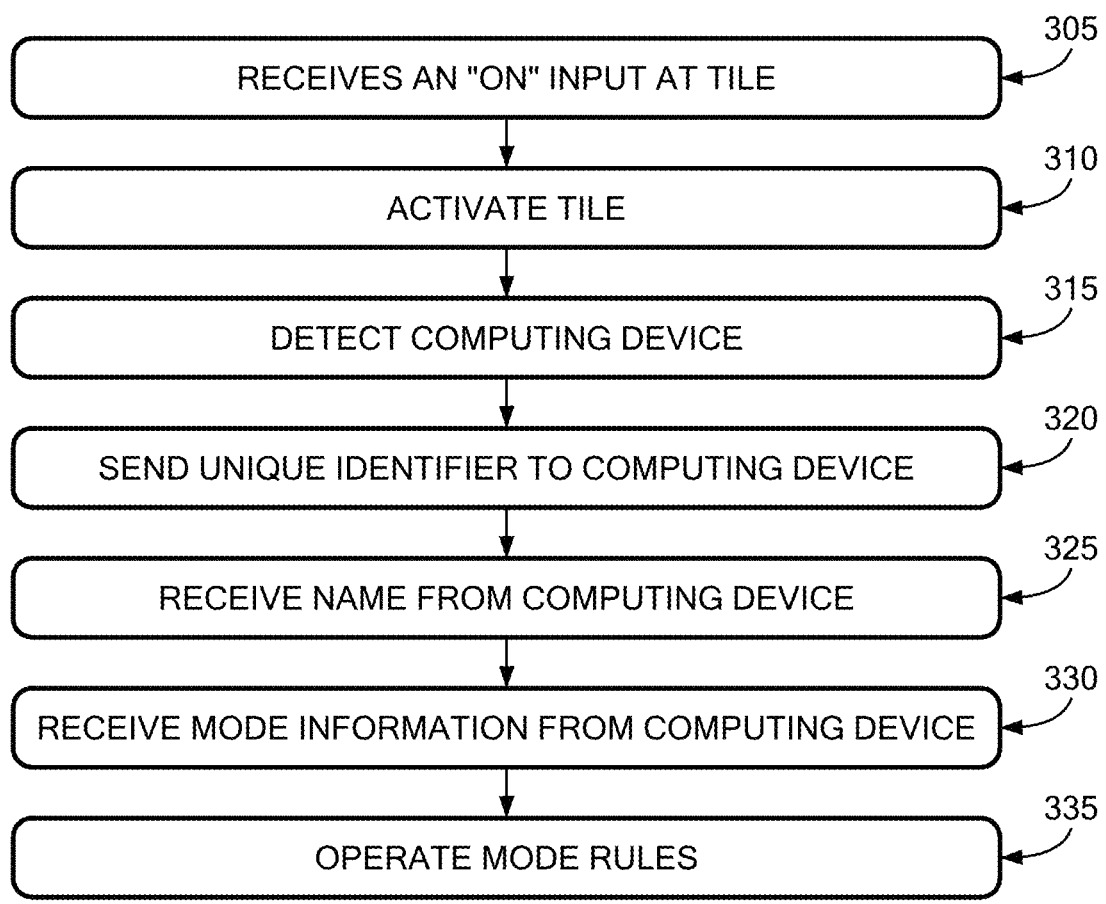
FIG. 3 shows a logic flow chart for operation of a method in accordance with an embodiment.

FIG. 3 shows a logic flow chart for operation of a method in accordance with an embodiment. When a tile receives an "on" input (e.g., via a button press) at block 305, it is activated at block 310. At block 315, the tile receives information that a computing device is searching for devices. Each tile has a unique identifier which it sends to the computing device at block 320. The tile receives an additional name from the computing device for reference by user at block 325. At block 330, the tile can now communicate with computing device. The tile receives information from computing device and a new "mode" is set containing rules for tile to follow (e.g., a rule might be that every time a tile receives an on input (a button press), it outputs blue light and a sound file specified) at block 335. Once information is transferred it is stored locally on the tile until a new game mode is set or changes to the mode are made in real-time.

Example of play: The tile receives input from sensor that it has been stepped on (or pressed), it processes the on/off information at the tile and outputs its given sequence from the code. In one non-limiting example, when the tile is pressed, the tile determines internally actions to take, for example, to set lights to a specified blue color and to emit specified sound. The tile can also communicate this back to the computing device and a step is recorded on the screen to add to the scoreboard.

System can be placed over a large area. Devices can be programmed around the space (e.g., within 25 ft. for Bluetooth/WiFi). Games are not screen-centered. Such a layout enables an experience between the sensors and in the real-world. This is also different from some earlier systems because it can operate without a screen.

Such products enable play in real life and can use multiple physical outputs distributed to communicate with one or more computing devices.

Connection to tiles—Tiles may connect via a Bluetooth discovery process. The tiles and/or controller can look at signal strength to get an idea of distance. In other embodiments, a camera could be used to determine distances between tiles and their locations.

Each tile may be associated with a unique serial number. Once connected, the tile may then be assigned an identifier by the controller, such as a small integer identifier or an assigned alphanumeric name.

Tiles may be connected individually to a single controller. Alternatively, sub-controllers may be used to expand the range and size of the tile network. In a further alternative, the tiles may communicate with each other to create a mesh network.

Figure 4:
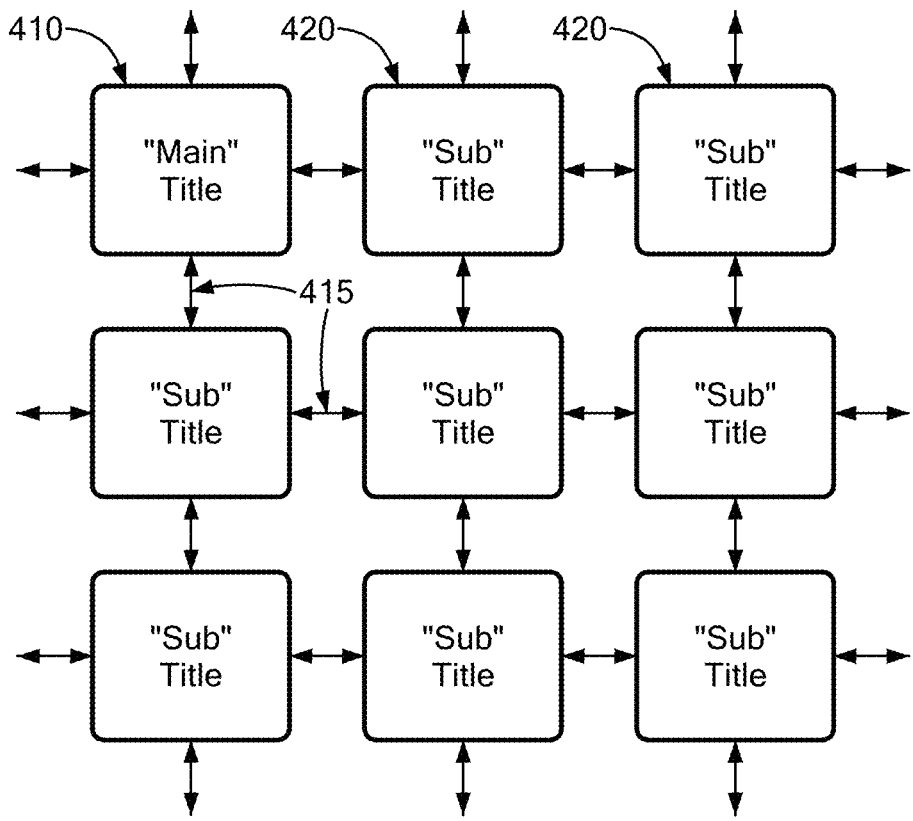
FIG. 4 illustrates various communication connections between interconnected tiles in accordance with an embodiment.

FIG. 4 illustrates various communication connections between interconnected tiles in accordance with an embodiment. The diagram illustrates a possible communication of modular tiles (and/or sensors) 410, 420. The tiles 420 can be expanded in any direction. The "Main" tile 410 is equipped with the module to communicate or load a program from one of the add-on modules via communications 415. The "Sub" tiles 420 collect information from each other tile 420, e.g., serial numbers, and pass that to the "Main" 410.

Using wireless communication technology, the tiles may be located throughout an area and may be placed on the floor, on a wall, etc. (for example, up to 25 feet apart or up to the limits of Bluetooth, WiFi or other wireless technology being used to connect the tiles and/or sensors).

In a further non-limiting embodiment, the tiles may be physically connected. Such a physical connection may be used to hold the tiles together, for example, using interlocking features (such as a 'jig-saw' type design) and/or magnets. These connections may align the tiles for near-field communications (NFC) such as infrared (IR) connections. In another non-limiting embodiment, the tiles may include pin/socket connections to enable direct electrical communication between tiles. Such connections may also physically hold the tiles together.

The mode information provided to the tiles may include the full program such that the tiles may determine which parts to perform. Alternatively, the controller may process a program so as to determine for each tile which rules to use. The controller may then provide the tile-specific rule sets to the associated tile.

In various embodiments, the tiles may perform some computation locally, for example, to automatically play a sound in response to detecting a touch. In other embodiments, the tiles may relay all input to a controller and perform output operations as instructed by the controller. In further embodiments, sub-controllers may determine what actions, if any, are to be performed by a sub-set of tiles and/or to relay information to the controller.

Figure 5:
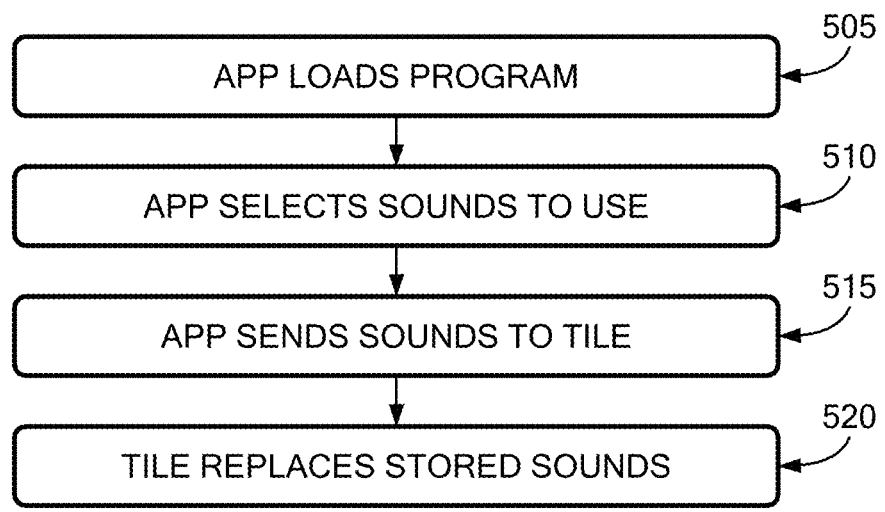
FIG. 5 shows a logic flow chart for operation of a method to setup the system in accordance with an embodiment.

FIG. 5 shows a logic flow chart for operation of a method to setup the system in accordance with an embodiment. At block 505, the app loads a program. The app can determine which sounds will be used based on files from the app and the program loaded at block 510. The method includes, at block 515, that the app then sends sound files. At block 520, the sent sound files replace local sound files on the tiles. The app can also send pieces of the program (e.g., block sequence and input/output rules) to the tile.

Example of Setup:

The app will walk people through the process of setting up each tile via Bluetooth (low energy). Each tile has a default name, and a dry erase area (or place to put a sticker) on the surface where a name can be written, once determined. Default names can include Jumpy and Smarty. Duplicate names will have a number appended to them, such as Jumpy(1).

A user can use an ID to store and retrieve programs. Sign up is optional and people can start programming right away. Tiles run firmware that polls the laptop/controller for updates at a regular interval to determine the action that they should be doing, or that reports an action (being stepped on) to the tablet.

The controller responds to the actions of individual tiles according the program that is running on its programming blocks-based app. The tile to perform a particular stack of blocks (called a script) is determined by the user using a special top hat block, that sits on top of the stack and says: "All tiles" or has a drop-down menu to select particular names of tiles. Multiple names can be selected.

The app does not need to know the location of each tile, just that they are within communication range or have gone beyond communication range, in which case they will appear as greyed out in the app.

Additional tiles can be added via startup or a menu item in the app. These tiles can be added to the list of tiles that can be programmed (in the top hat block).

Sounds can be designated to play from a specific tile or from the tablet or from all tiles. Tiles can light up individual or all LED lights in any RGB color. Tiles can sense when being stepped on. Tiles can also communicate low-battery conditions.

The tiles can store the firmware that lets them talk to the app. Firmware updates can occur over the air via the app.

During startup, the app launches and the last user ID is loaded. The last program is also loaded, although a library of past projects is available, and the user can create new projects.

The user is prompted to connect new tiles, for example, via a plus button. Users can see tiles that have been previously connected and they are shown tiles that are online. The user can also see tiles that have been connected previously that are offline. Programs that refer to specific tiles are shown in a bright color if they are connected. Programs that refer to specific tiles are dulled/dimmed if the tiles are not available. The user can also be prompted to change specific tile scripts to one of the available tiles.

Figure 6:
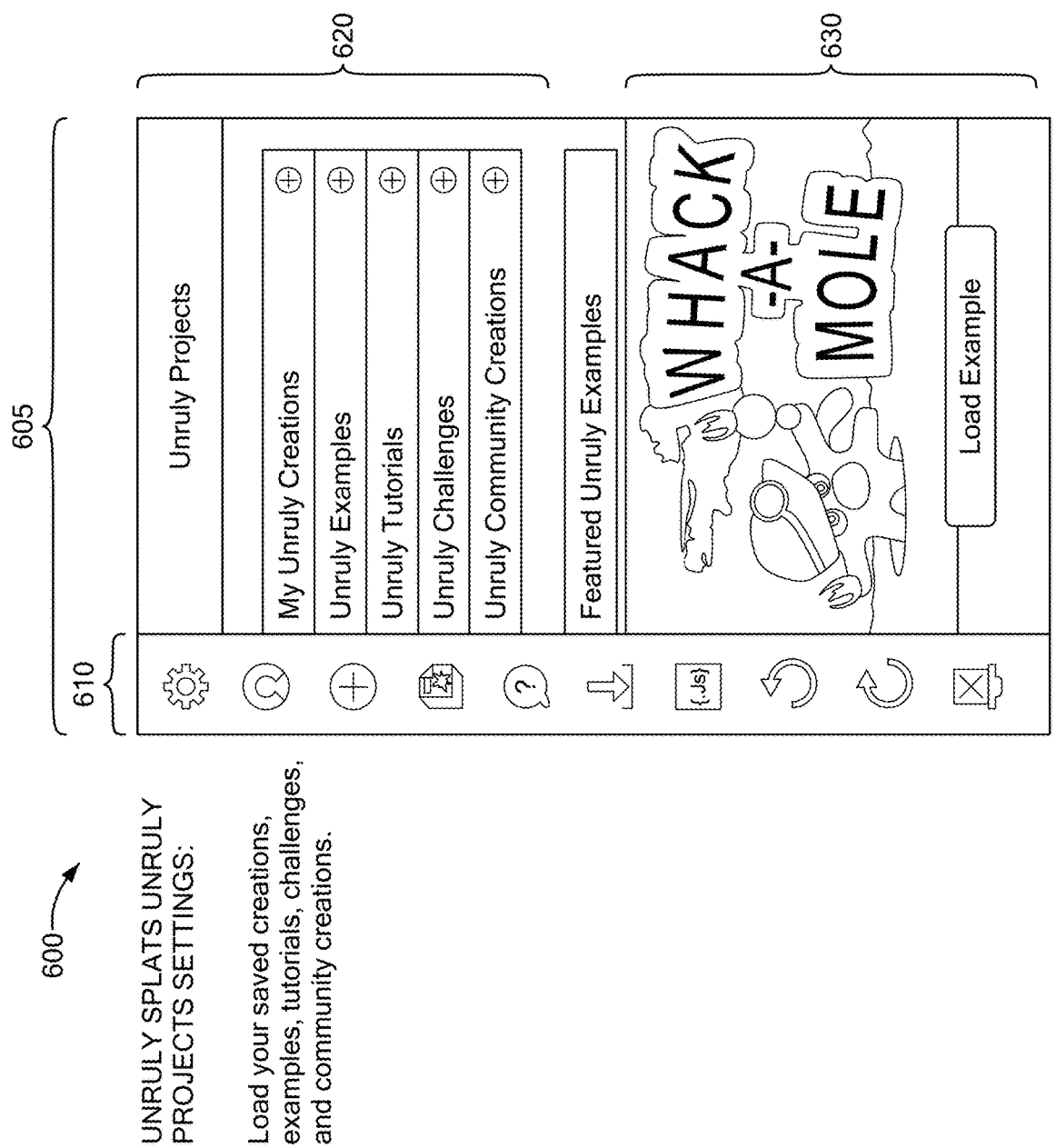
FIG. 6 demonstrates a sample user interface (UI) of a projects screen in accordance with an embodiment.

FIGS. 6-28 demonstrates a sample user interface (UI) 600 for navigating projects in accordance with an embodiment. FIG. 6 demonstrates the UI 600 presenting a projects screen 605. User shortcuts 610 are shown. The projects screen 605 also includes a projects panel 620 to allow the user to select various types of projects and a featured panel 630 to show various notices or examples.

Figure 7:
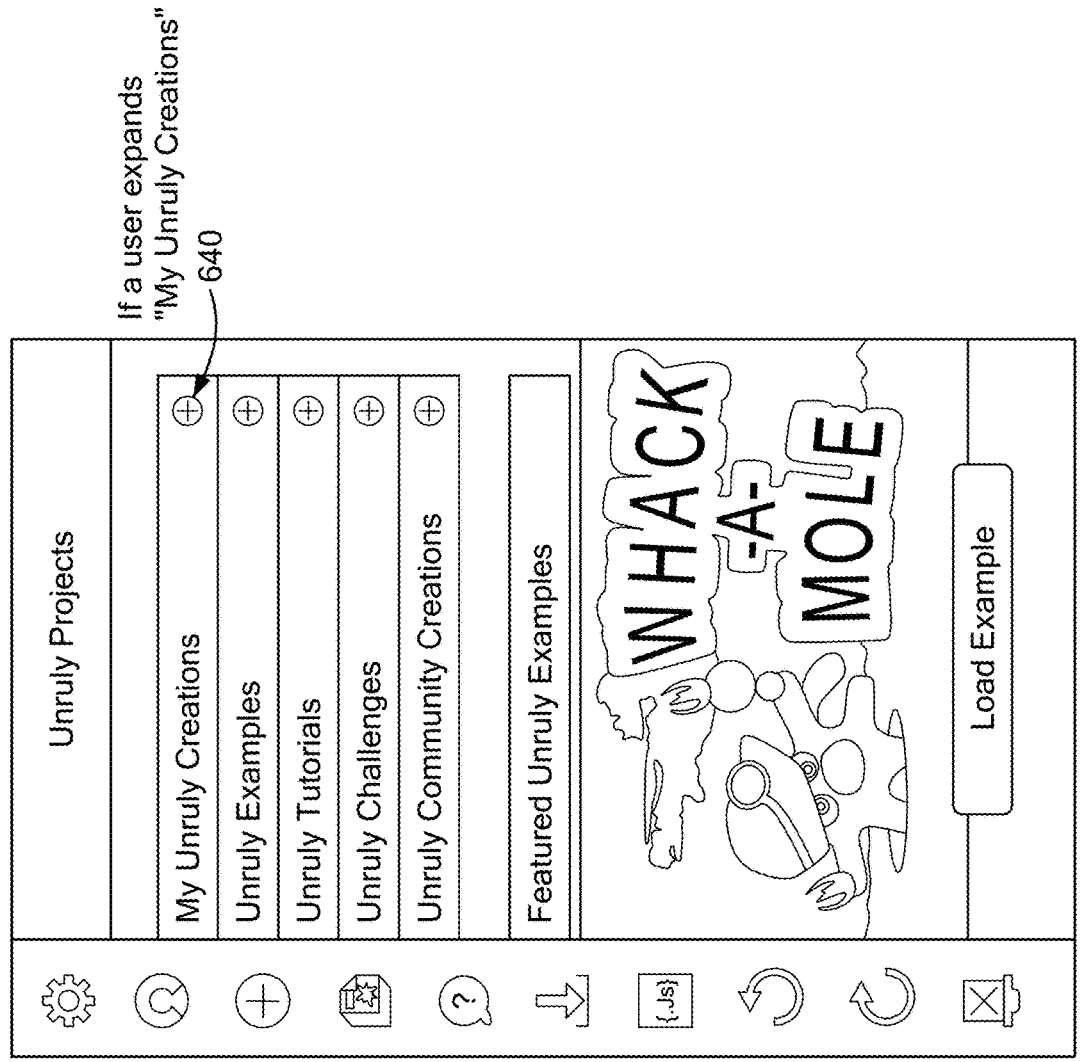
FIG. 7 demonstrates a sample UI of the projects screen in accordance with the embodiment.
Figure 8:
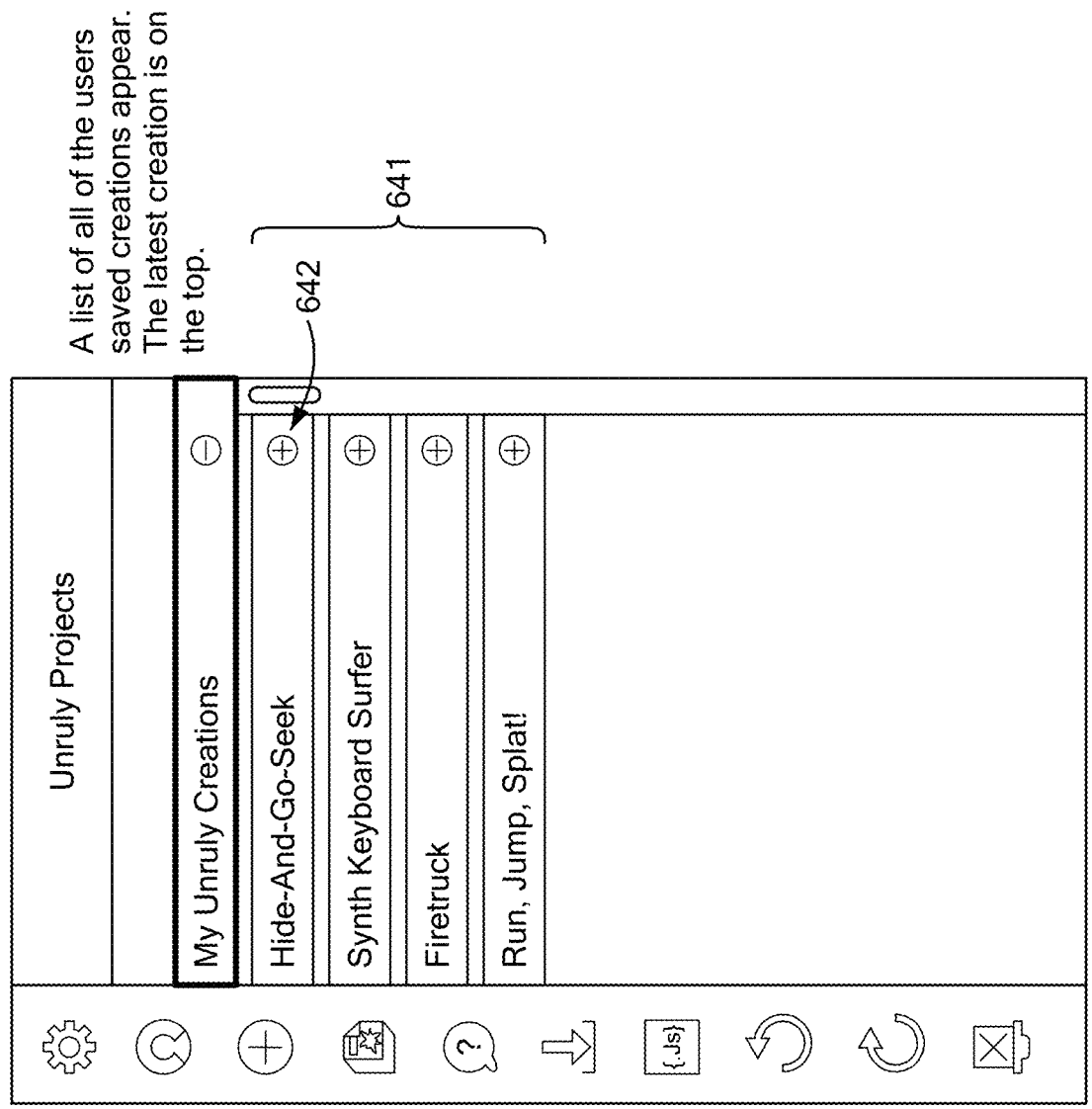
FIG. 8 demonstrates a sample UI of a saved creations selection screen in accordance with the embodiment.
Figure 9:
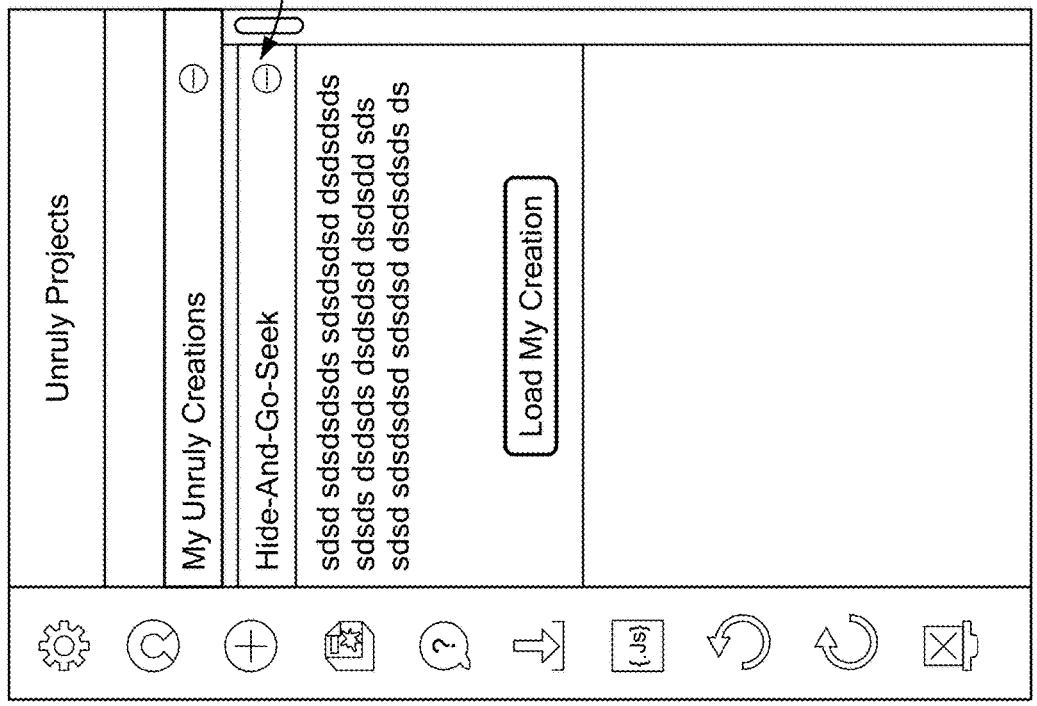
FIG. 9 demonstrates a sample UI of a screen showing a selected saved creation in accordance with the embodiment.
Figure 10:
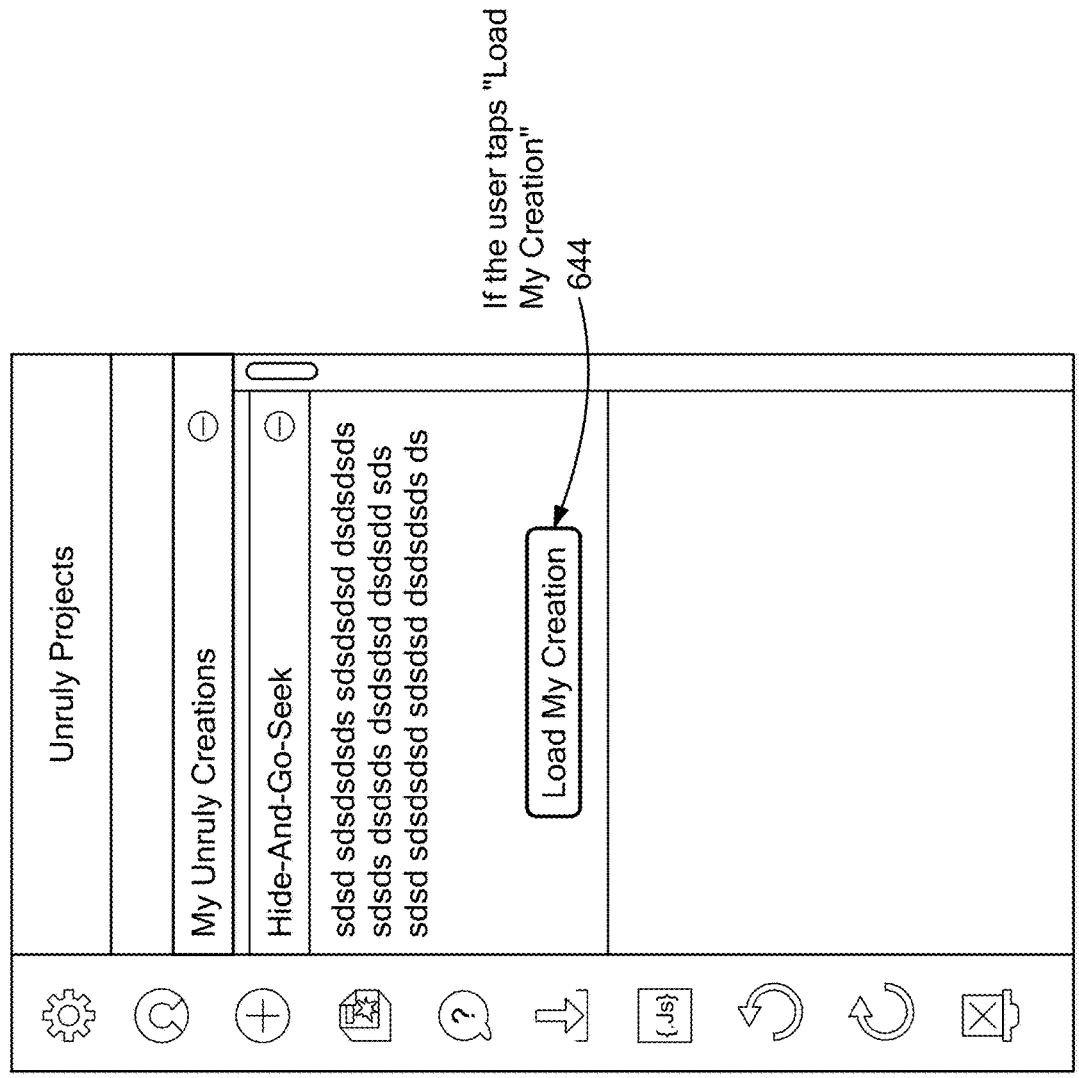
FIG. 10 demonstrates a sample UI of the screen showing how to load the saved creation in accordance with the embodiment.
Figure 11:
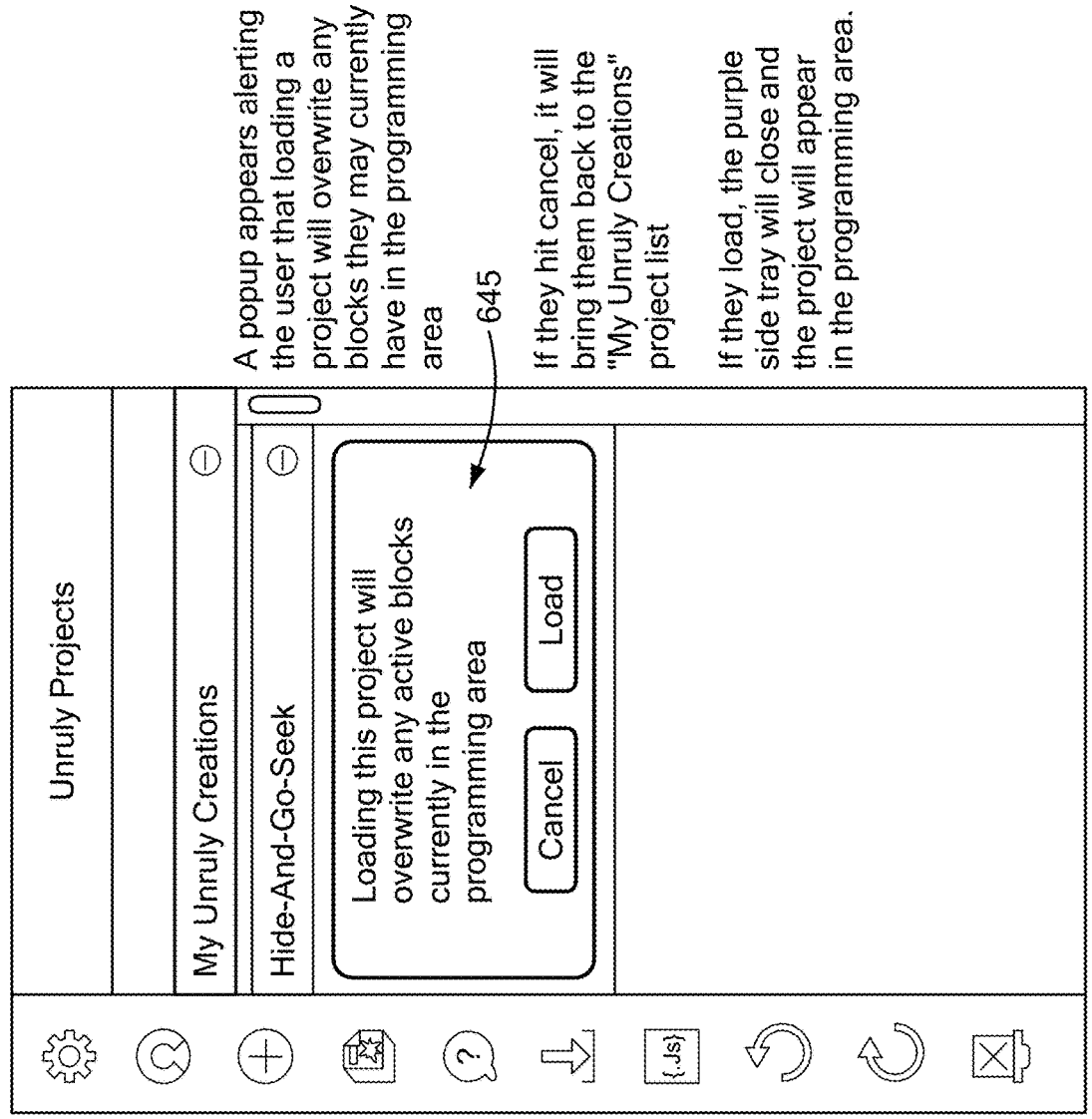
FIG. 11 demonstrates a sample UI of a creation load confirmation screen in accordance with the embodiment.

FIG. 7 shows that the user can select a heading by clicking an icon 640. After selecting the icon 640, various creation 641 are presented. The user can select a creation, for example, by selecting bar 642 in FIG. 8. FIG. 9 shows the popup window provided in response to selecting bar 642. In FIG. 10 the user can opt to load the creation by selecting button 644. A creation load confirmation screen 645 is presented in FIG. 11.

Figure 12:
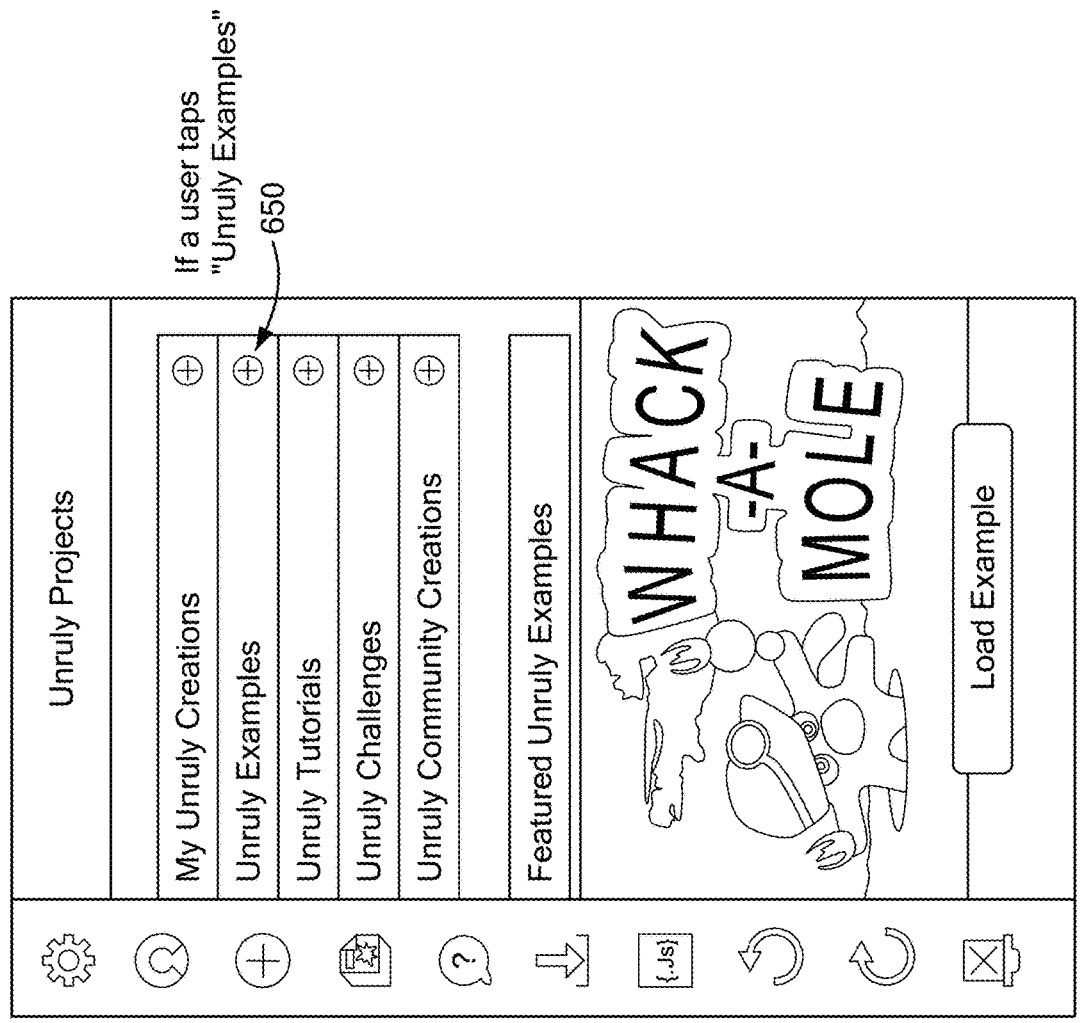
FIG. 12 demonstrates a sample UI of the projects screen in accordance with the embodiment.
Figure 13:
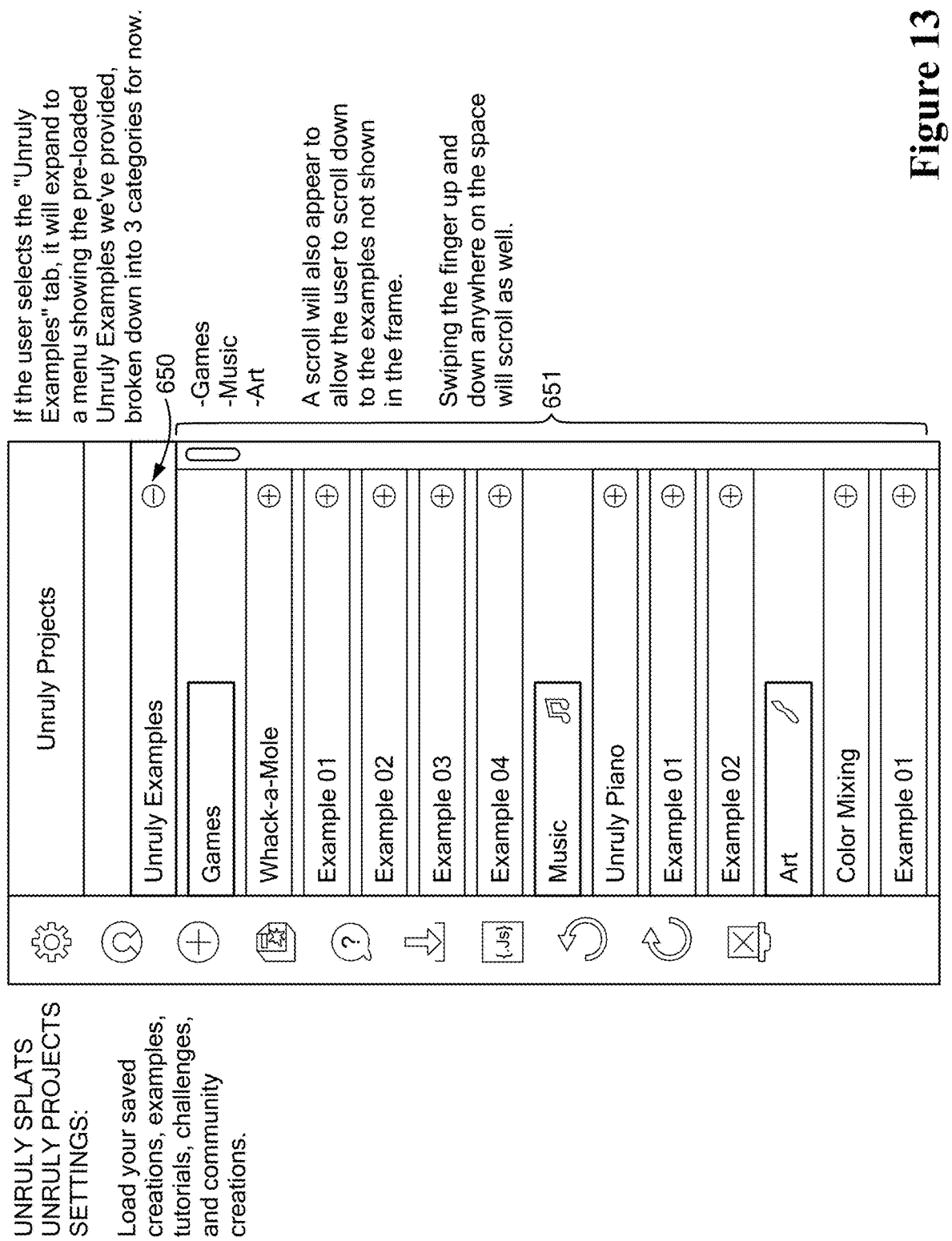
FIG. 13 demonstrates a sample UI of an examples selection screen in accordance with the embodiment.
Figure 14:
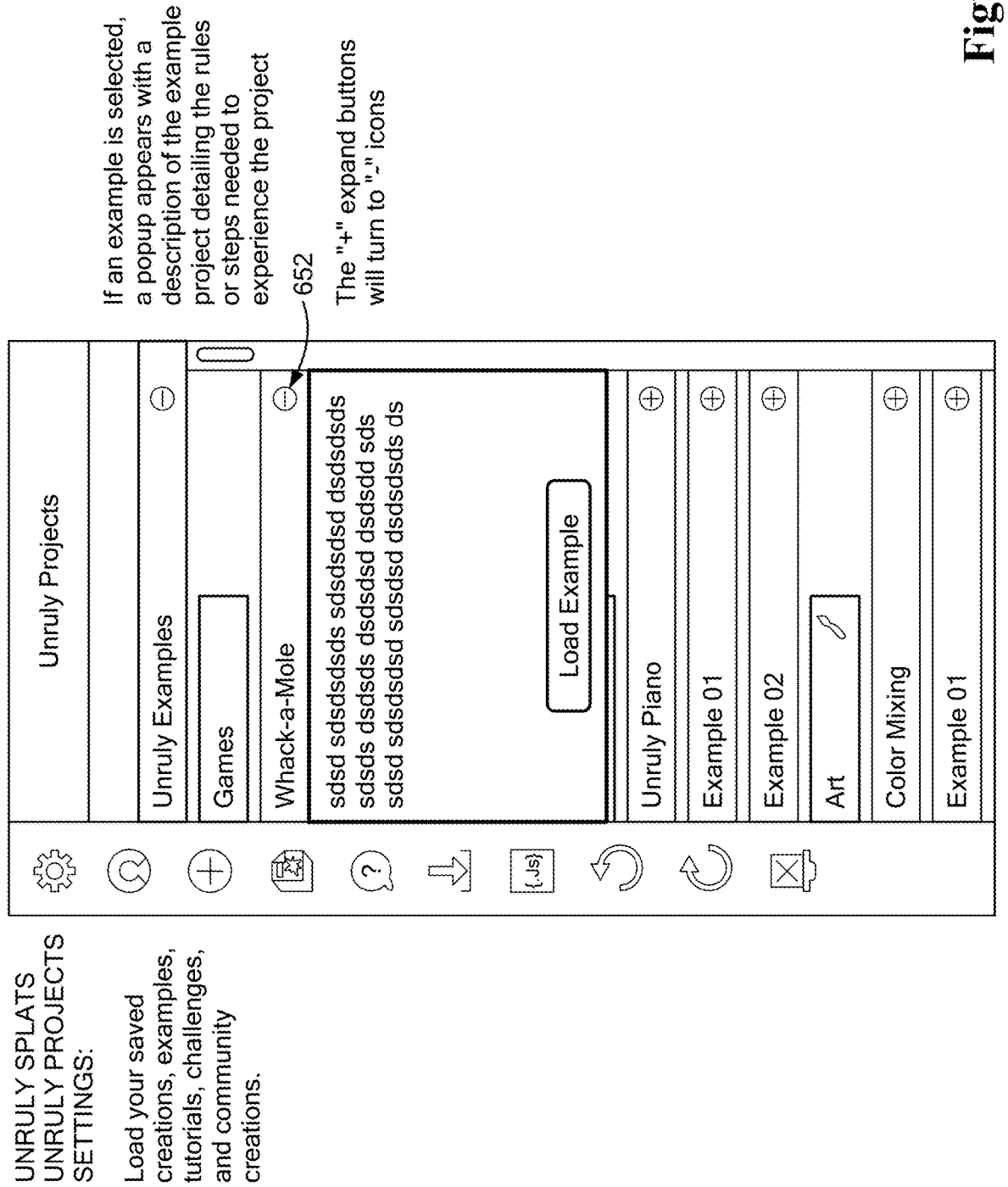
FIG. 14 demonstrates a sample UI of a selected example screen in accordance with the embodiment.
Figure 15:
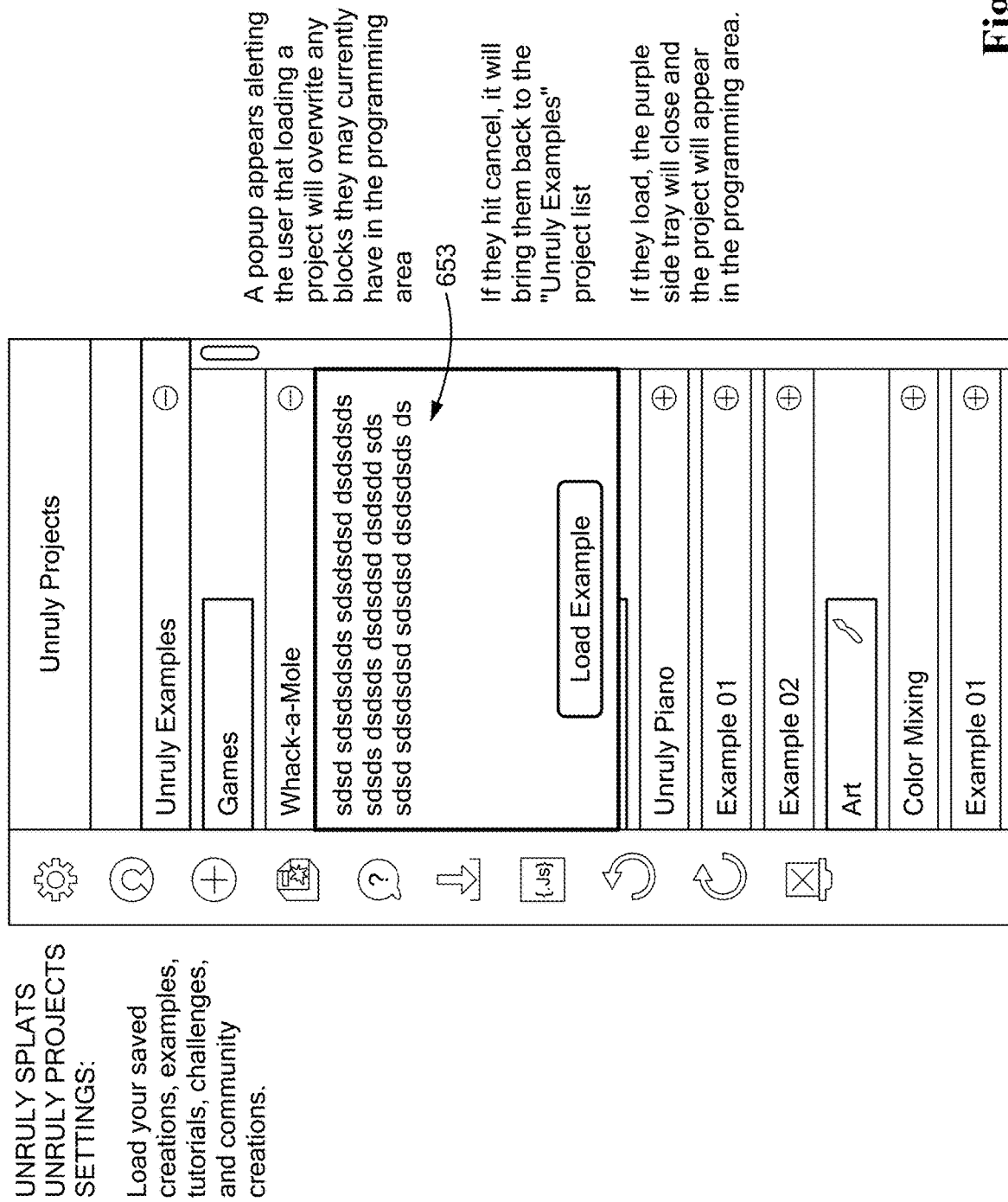
FIG. 15 demonstrates a sample UI of the selected game example screen in accordance with the embodiment.

Similarly, users can access example projects using icon 650 (shown in FIG. 12). A list 651 is presented (FIG. 13) from which the user may select an individual example by clicking on a bar 652 (FIG. 14). This provides a popup window 653 (FIG. 15) with further details and allowing the user to load the example.

Figure 16:
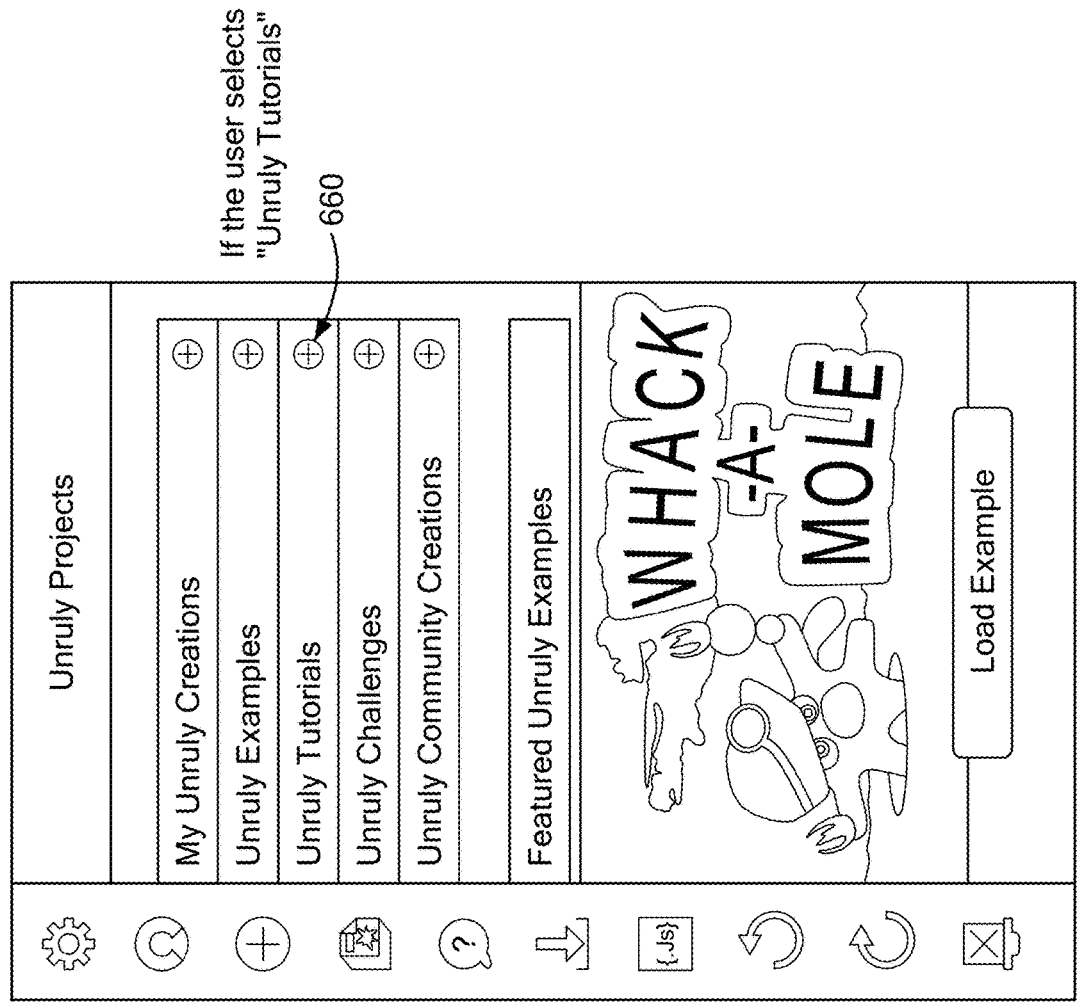
FIG. 16 demonstrates a sample UI of the projects screen in accordance with the embodiment.
Figure 17:
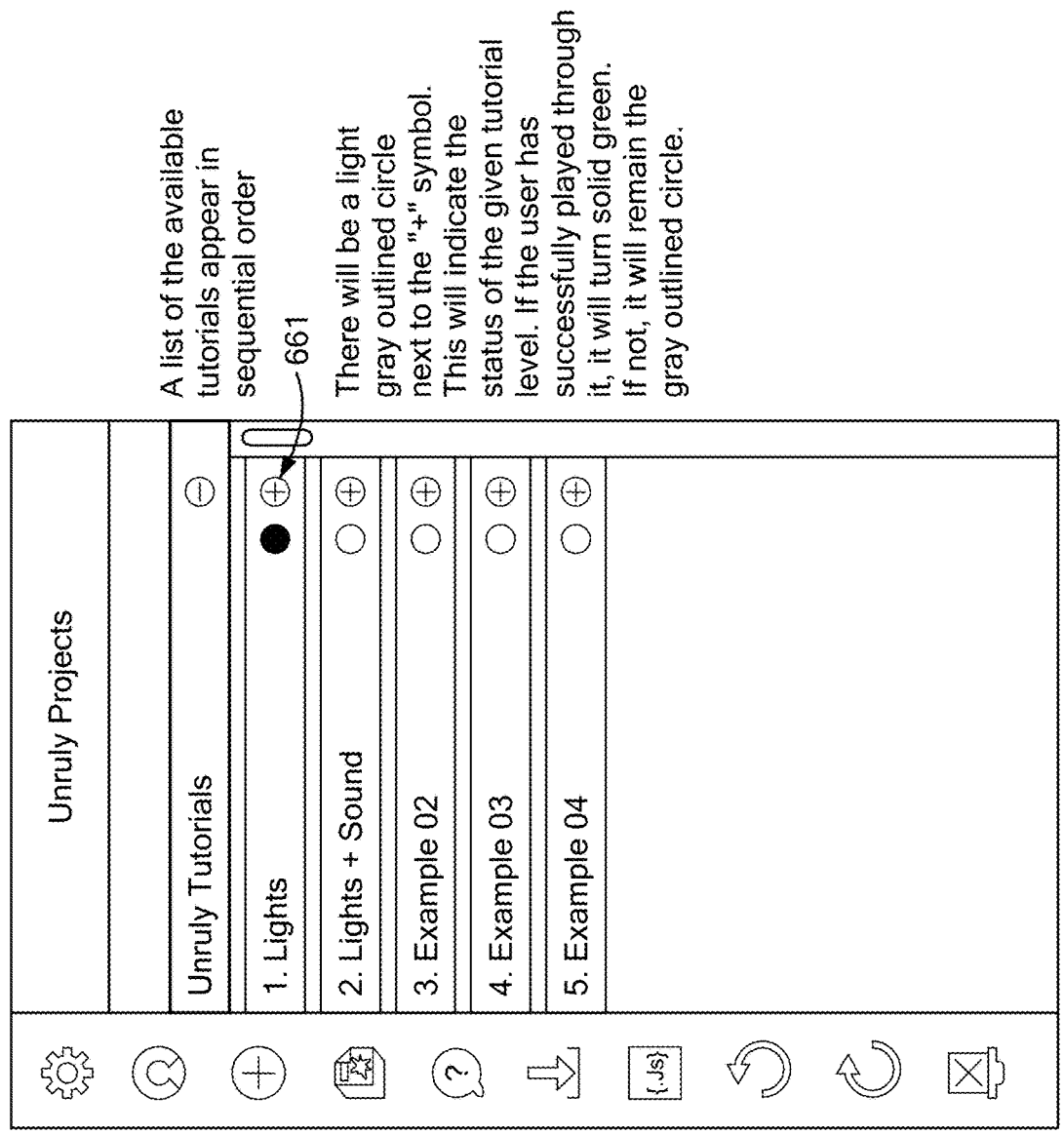
FIG. 17 demonstrates a sample UI of a tutorial selection screen in accordance with the embodiment.
Figure 18:
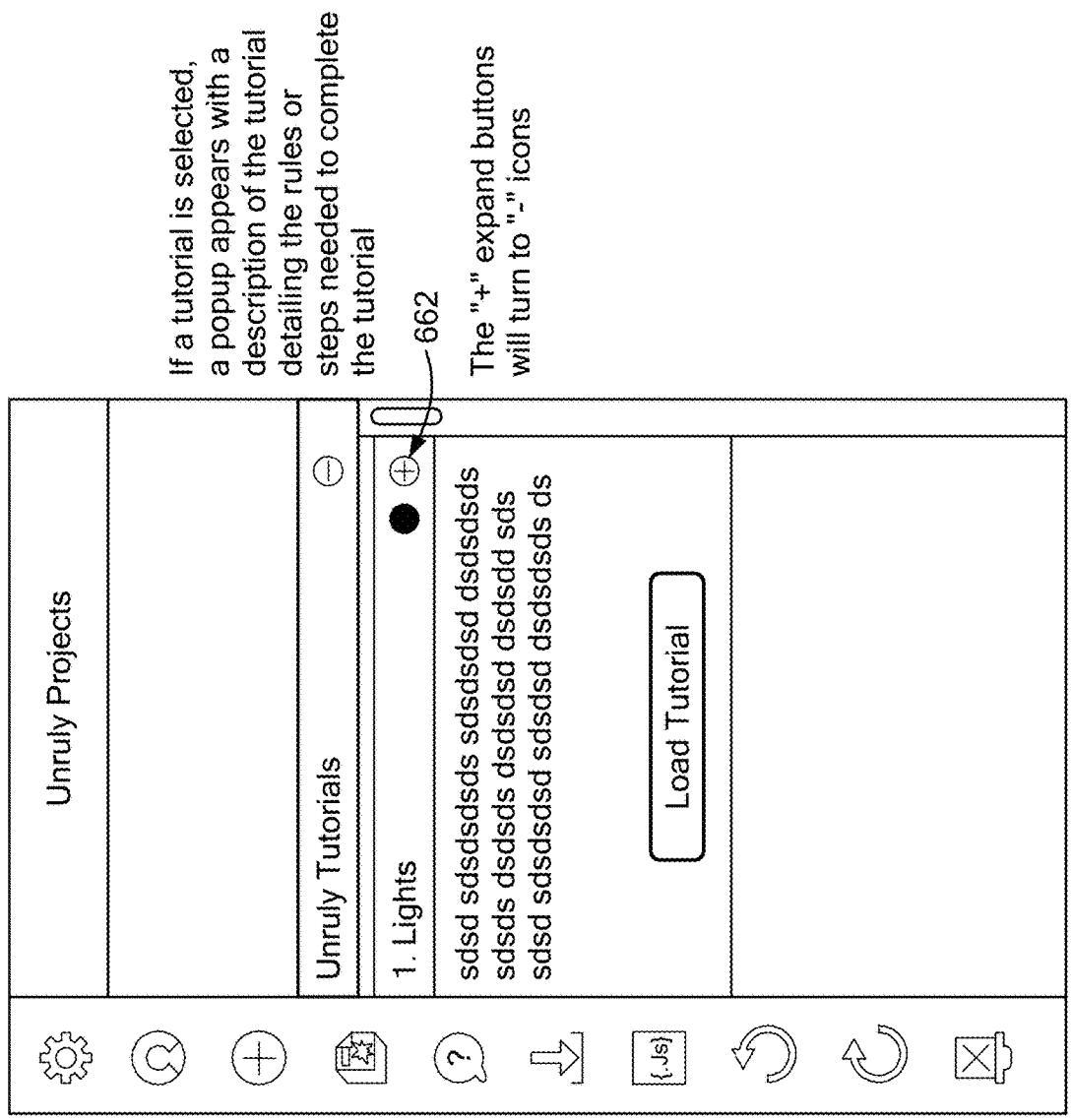
FIG. 18 demonstrates a sample UI of a selected tutorial screen in accordance with the embodiment.
Figure 19:
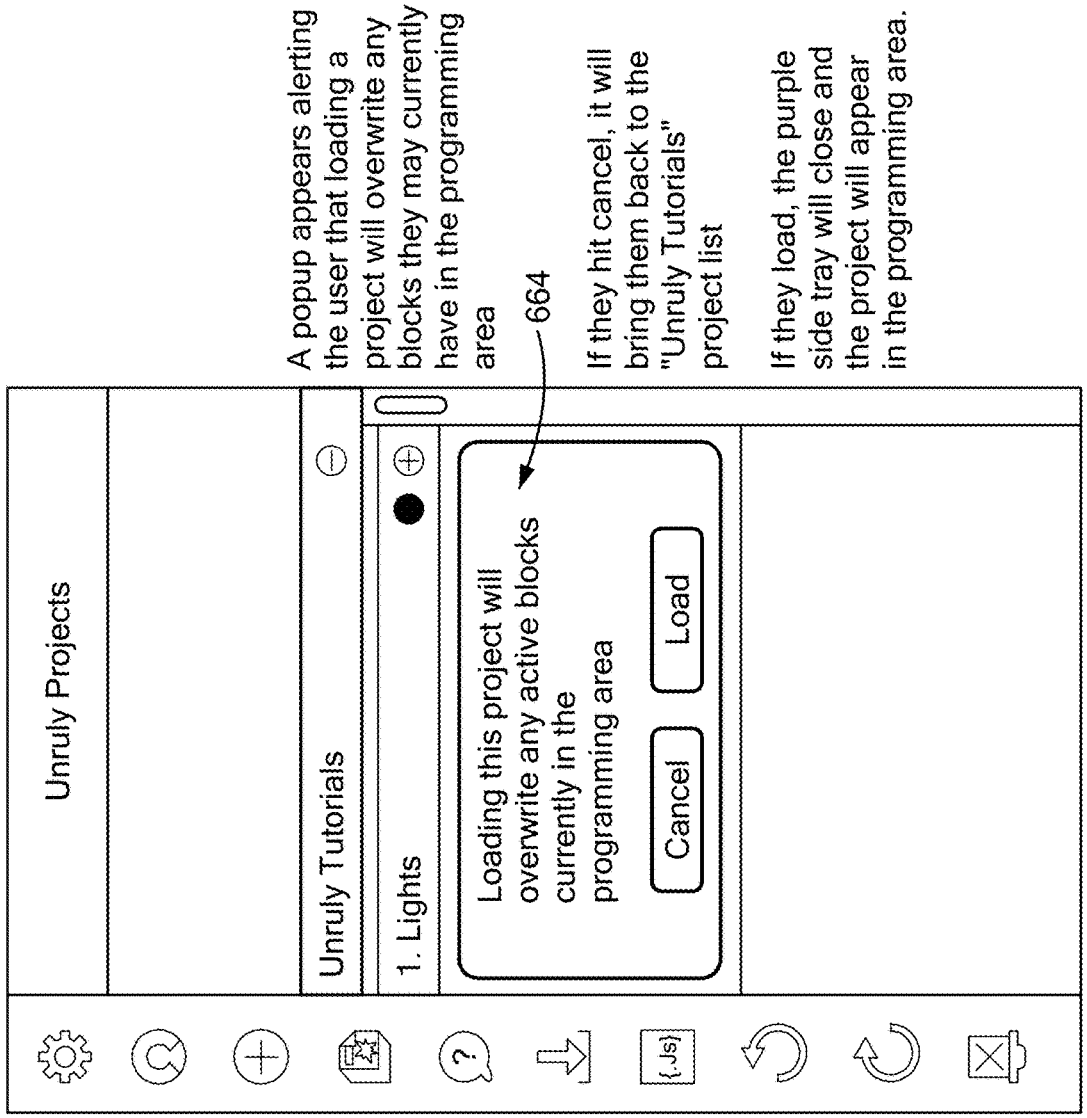
FIG. 19 demonstrates a sample UI of a tutorial load confirmation screen in accordance with the embodiment.

In FIG. 16, the user may select bar 660 in order to be provided a list 661 (FIG. 17) of tutorials. Selecting a tutorial bar (FIG. 18) presents a popup window 662 (FIG. 18). When loading the tutorial, a tutorial load confirmation screen 664 is provided to the user (FIG. 19).

Figure 20:
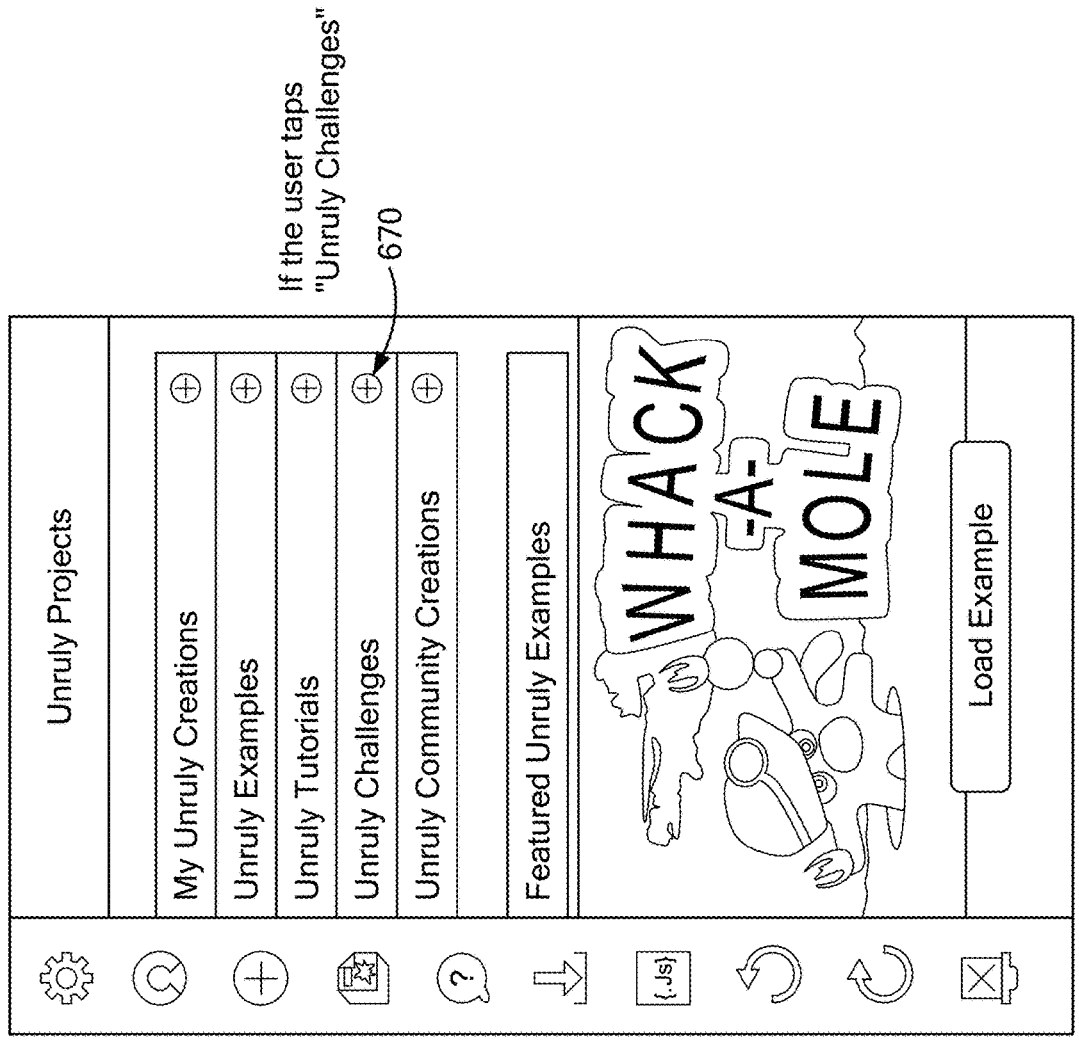
FIG. 20 demonstrates a sample UI of the projects screen in accordance with the embodiment.
Figure 21:
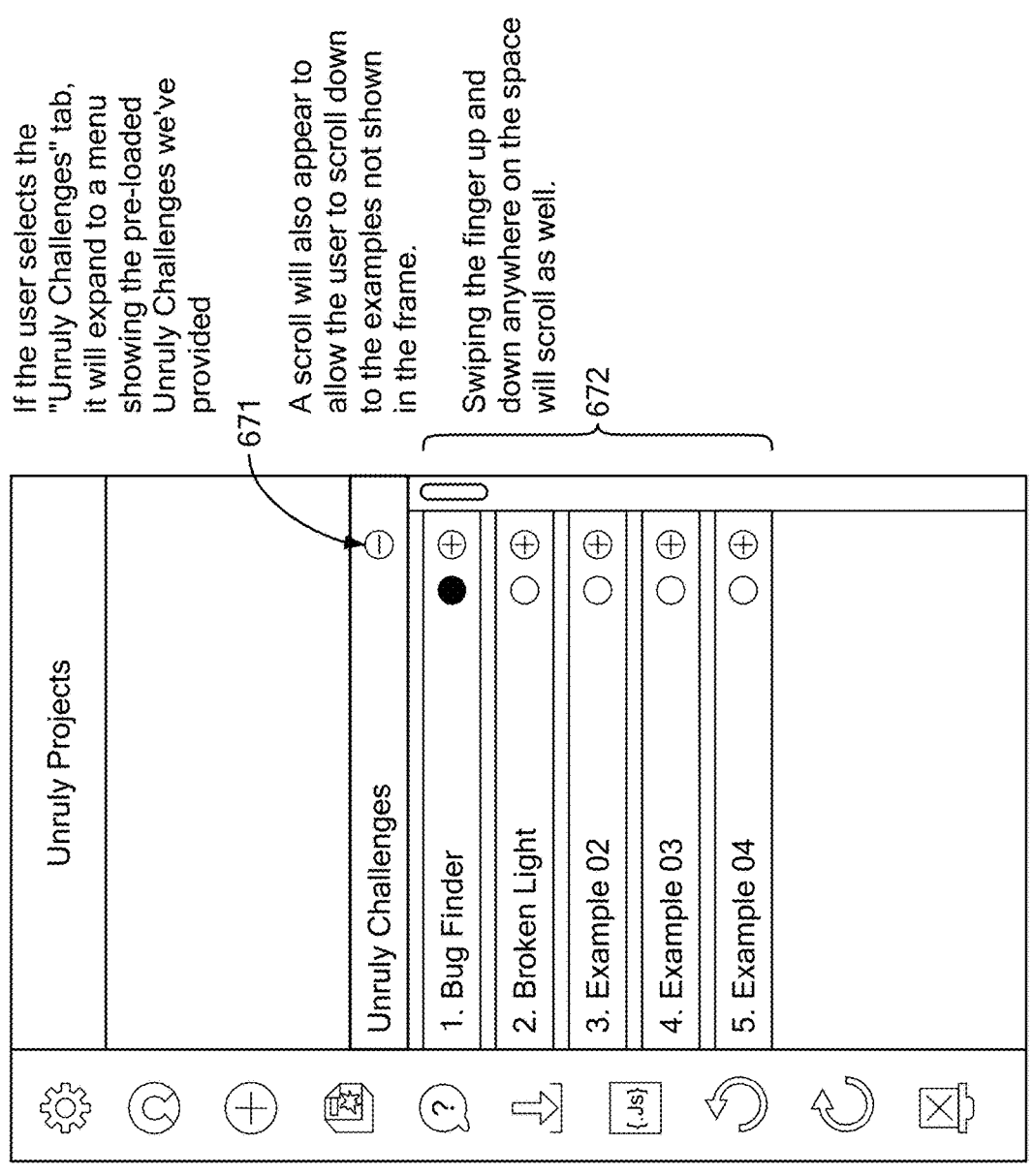
FIG. 21 demonstrates a sample UI of a challenges selection screen in accordance with the embodiment.
Figure 22:
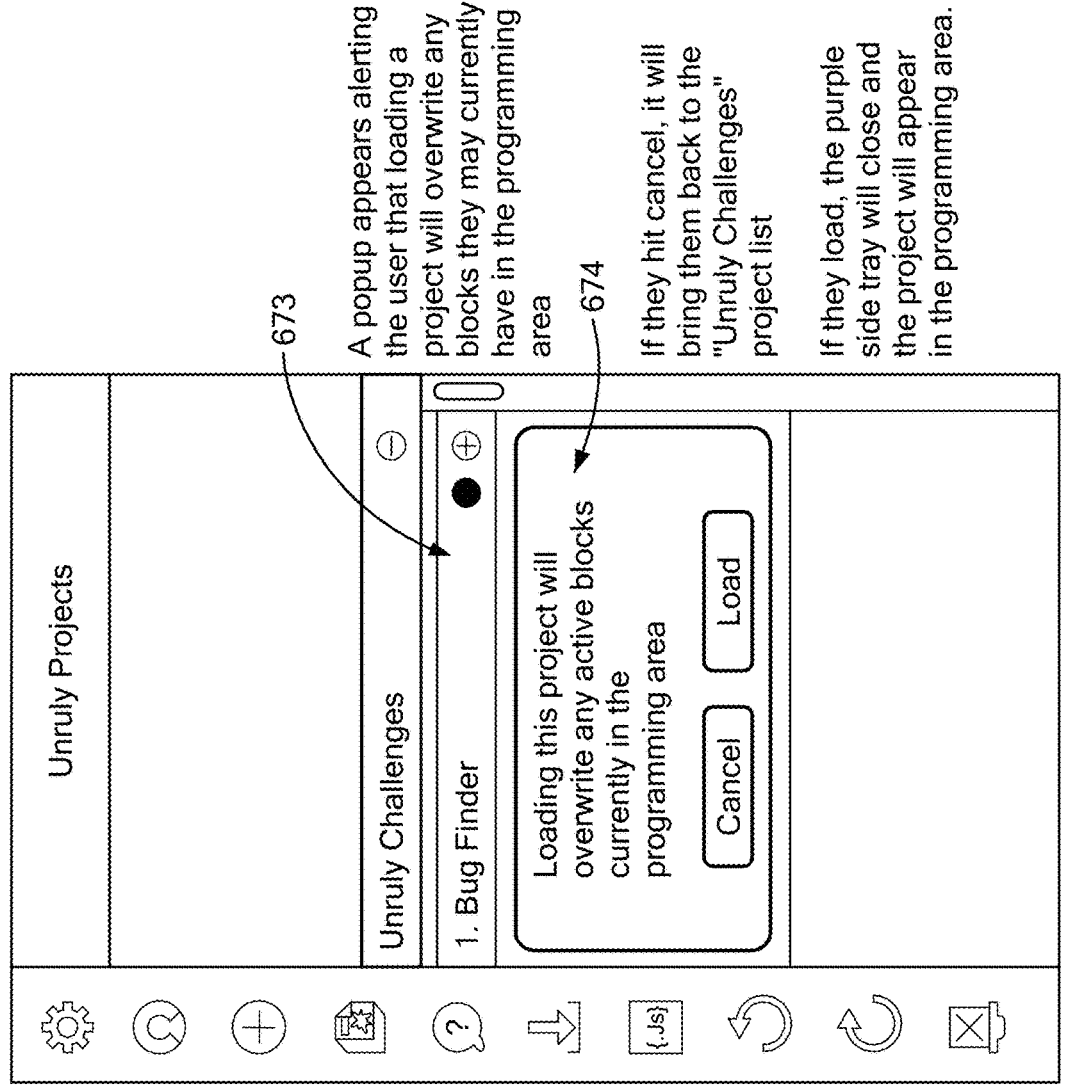
FIG. 22 demonstrates a sample UI of a challenge load confirmation screen in accordance with the embodiment.

Challenges are likewise accessible via bar 670 (FIG. 20). Selecting bar 670 presents a list 672 of challenges (FIG. 21). In FIG. 22, a challenge load confirmation screen 674 is shown after selecting bar 673.

Figure 23:
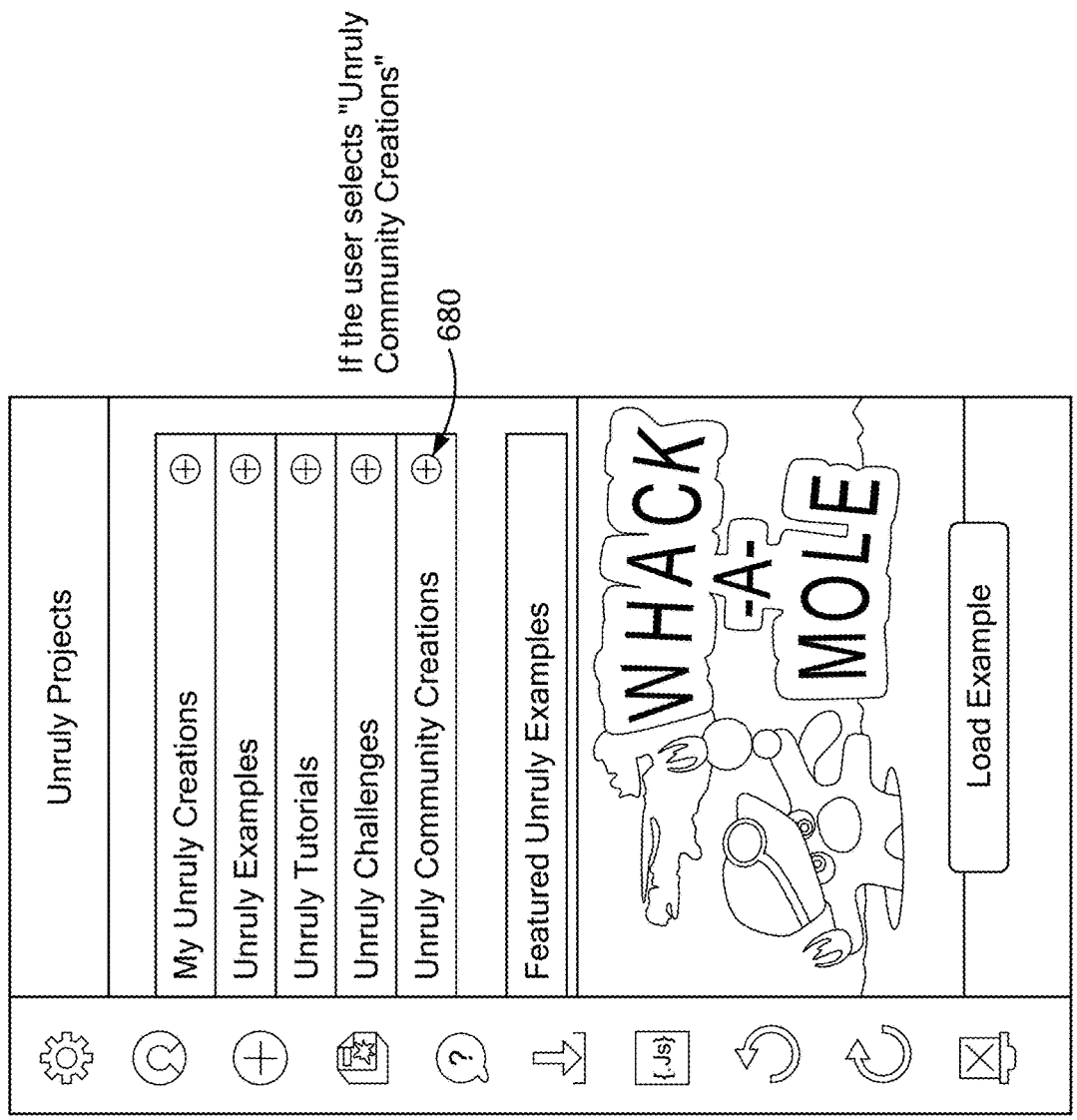
FIG. 23 demonstrates a sample UI of the projects screen in accordance with the embodiment.
Figure 24:
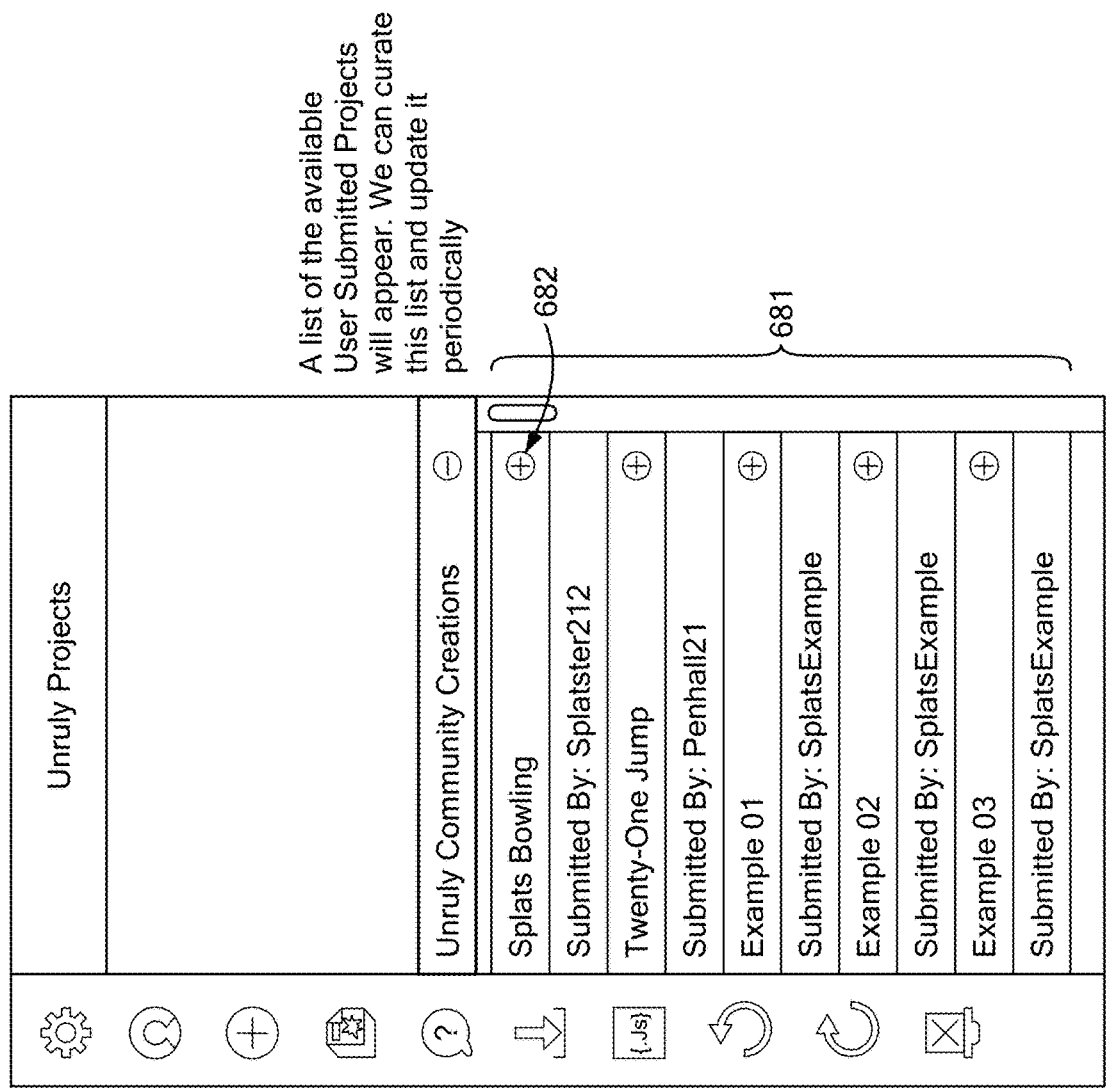
FIG. 24 demonstrates a sample UI of a community creations selection screen in accordance with the embodiment.
Figure 25:
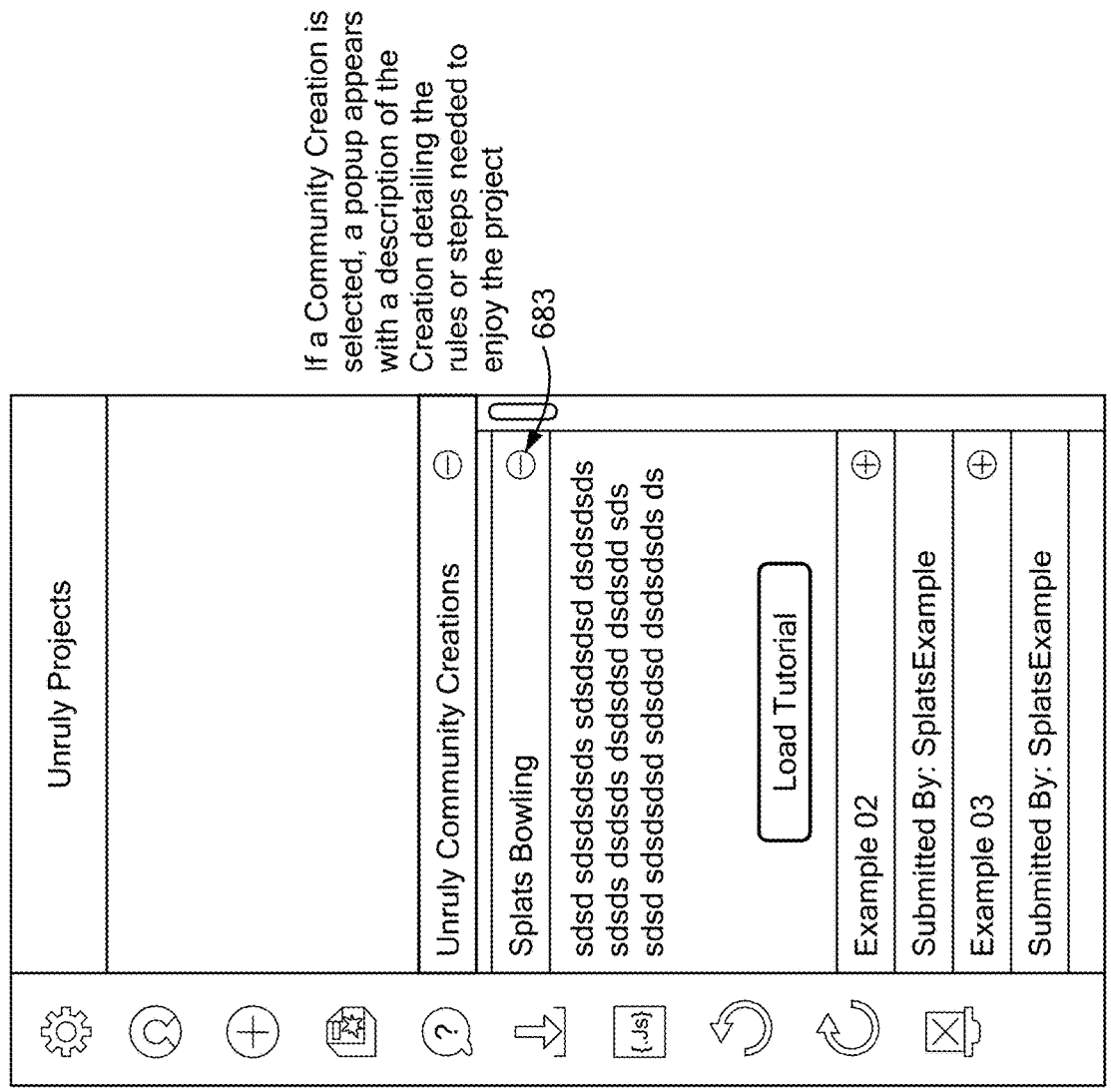
FIG. 25 demonstrates a sample UI of a selected community creation screen in accordance with the embodiment.
Figure 26:
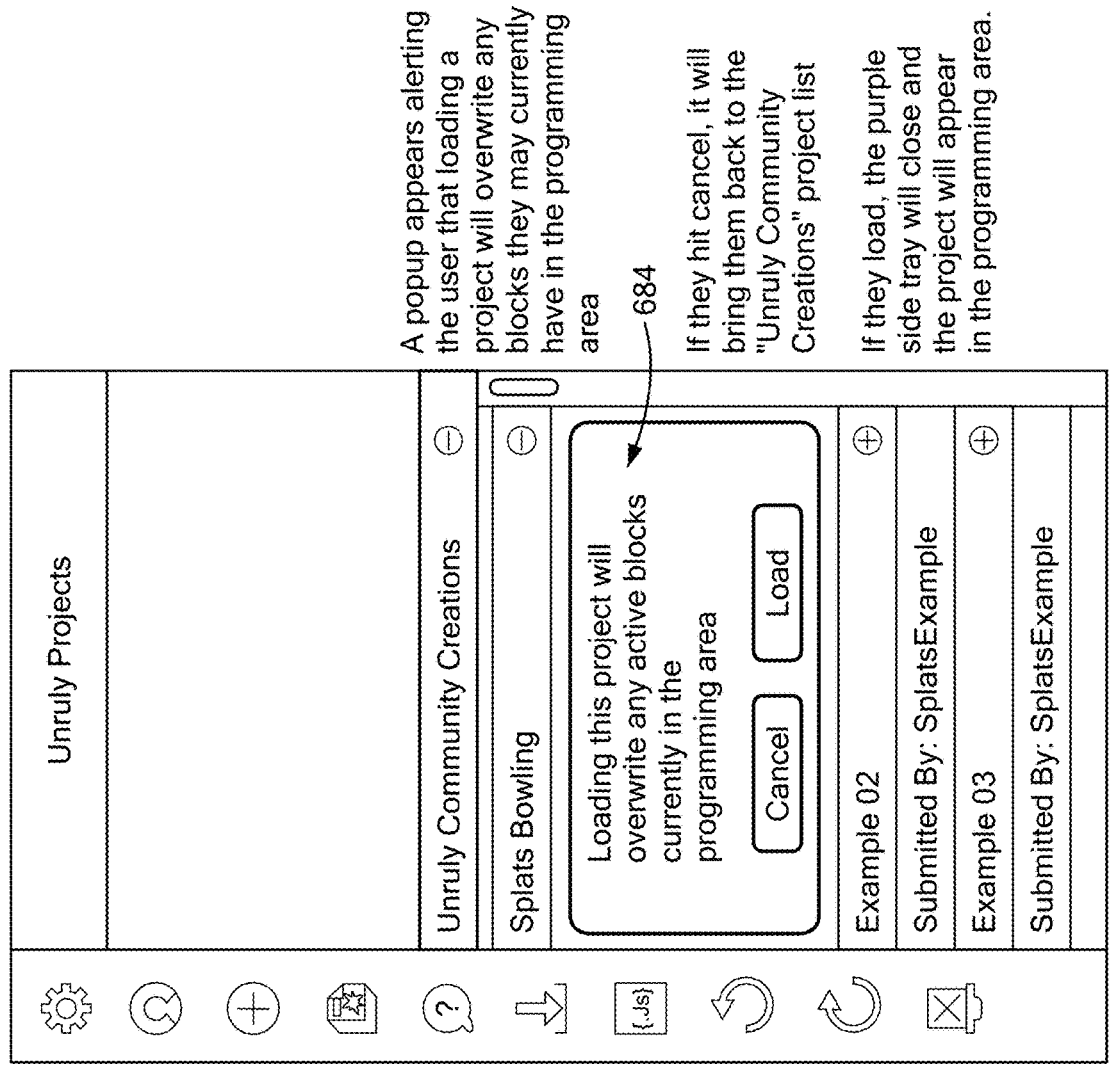
FIG. 26 demonstrates a sample UI of a community creation load confirmation screen in accordance with the embodiment.
Figure 27:
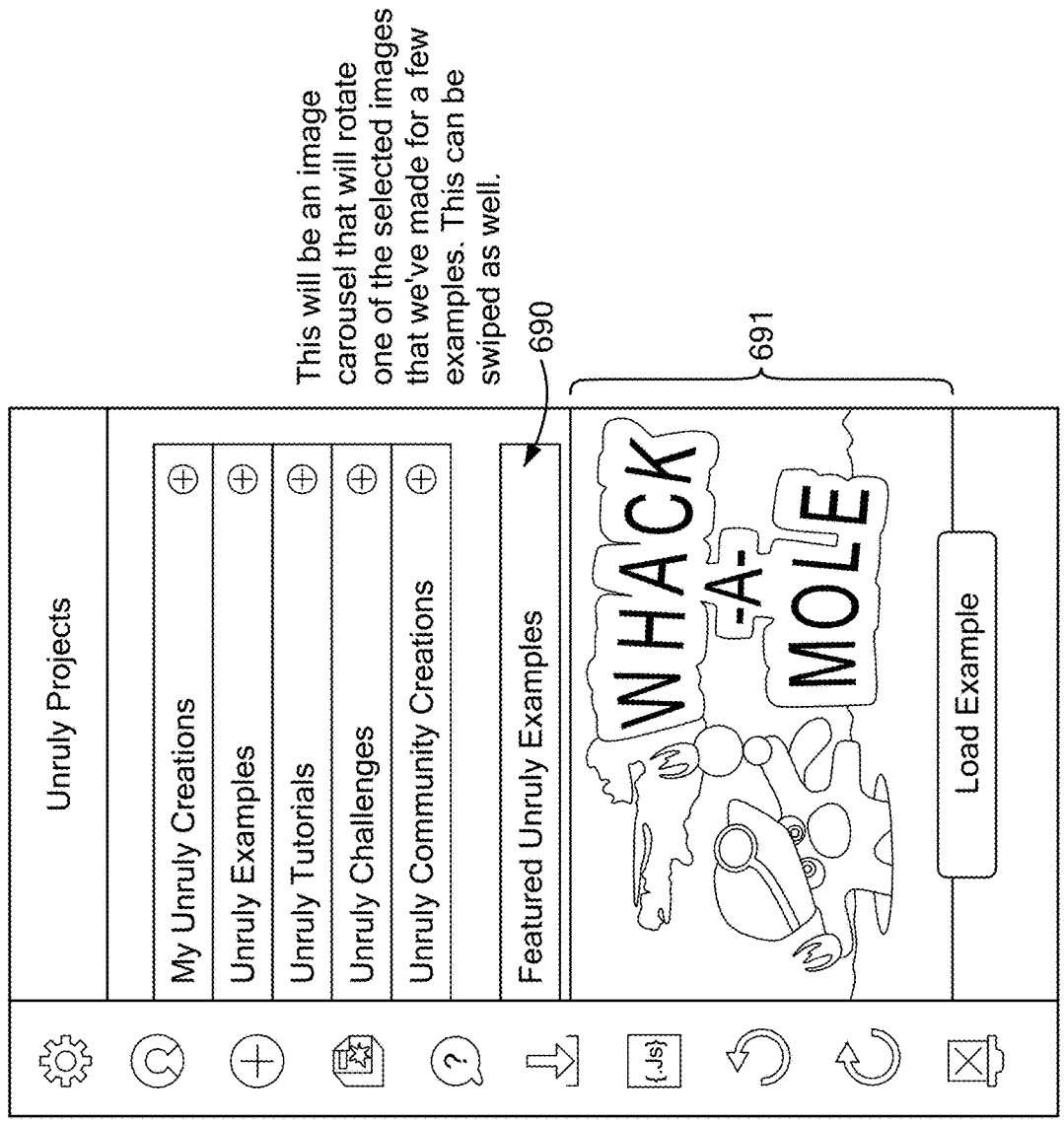
FIG. 27 demonstrates a sample UI of the projects screen in accordance with the embodiment.

Users may review community creations by selecting bar 680 (FIG. 23). As shown in FIG. 24, the list 681 of community creations includes individual creations and information regarding who submitted the creation. Selecting bar 682 provides a popup window 683 (FIG. 25). When the user attempts to load the community creation, a community creation load confirmation screen 684 is shown.

Figure 28:
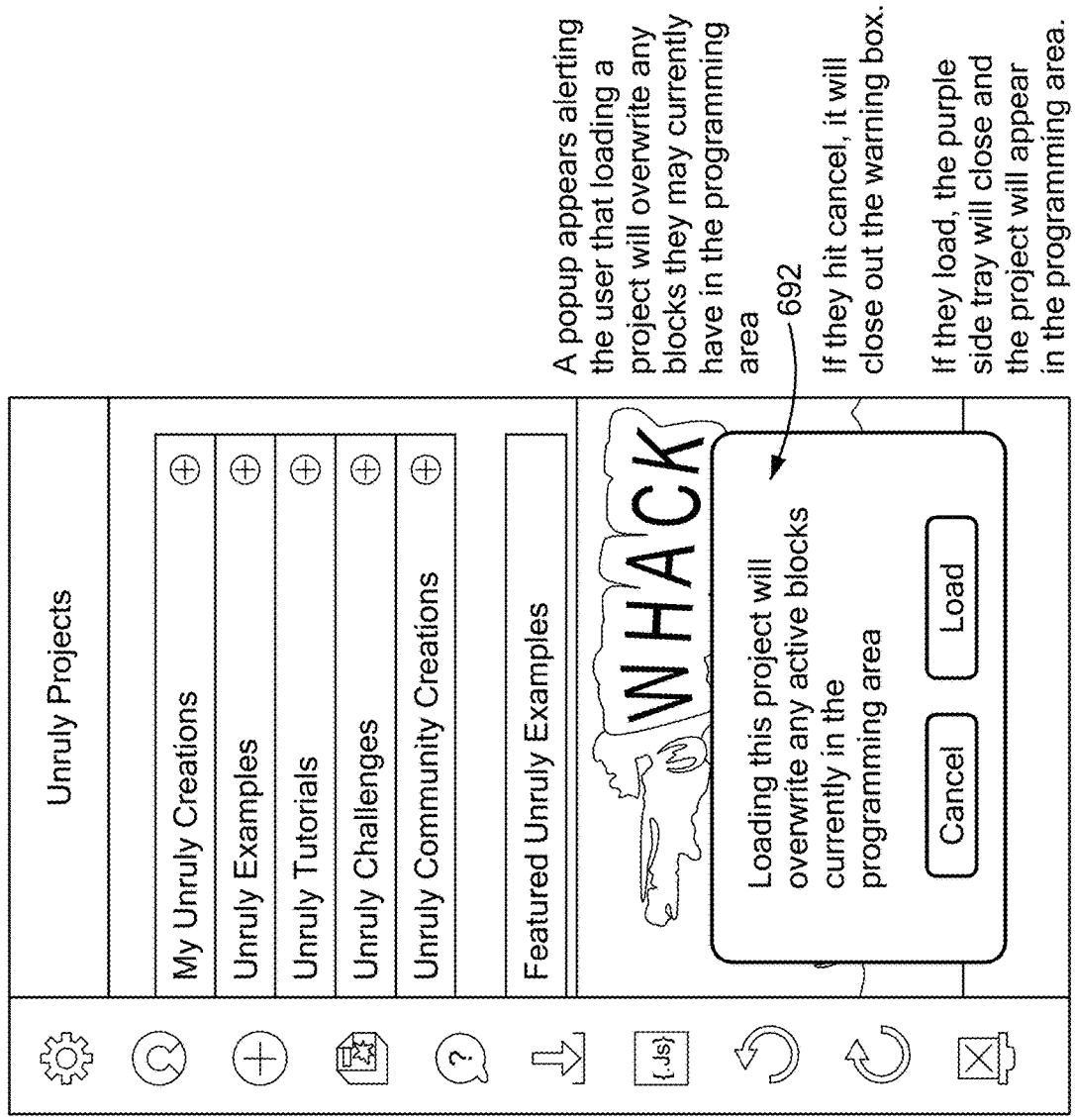
FIG. 28 demonstrates a sample UI of a featured example load confirmation screen in accordance with the embodiment.

As described above, the featured panel 630 can be used to show various notices or examples. The featured panel 630 includes a heading 690 and detail panel 691, see FIG. 27. In FIG. 28, a featured example load confirmation screen 692 is shown.

Figure 29:
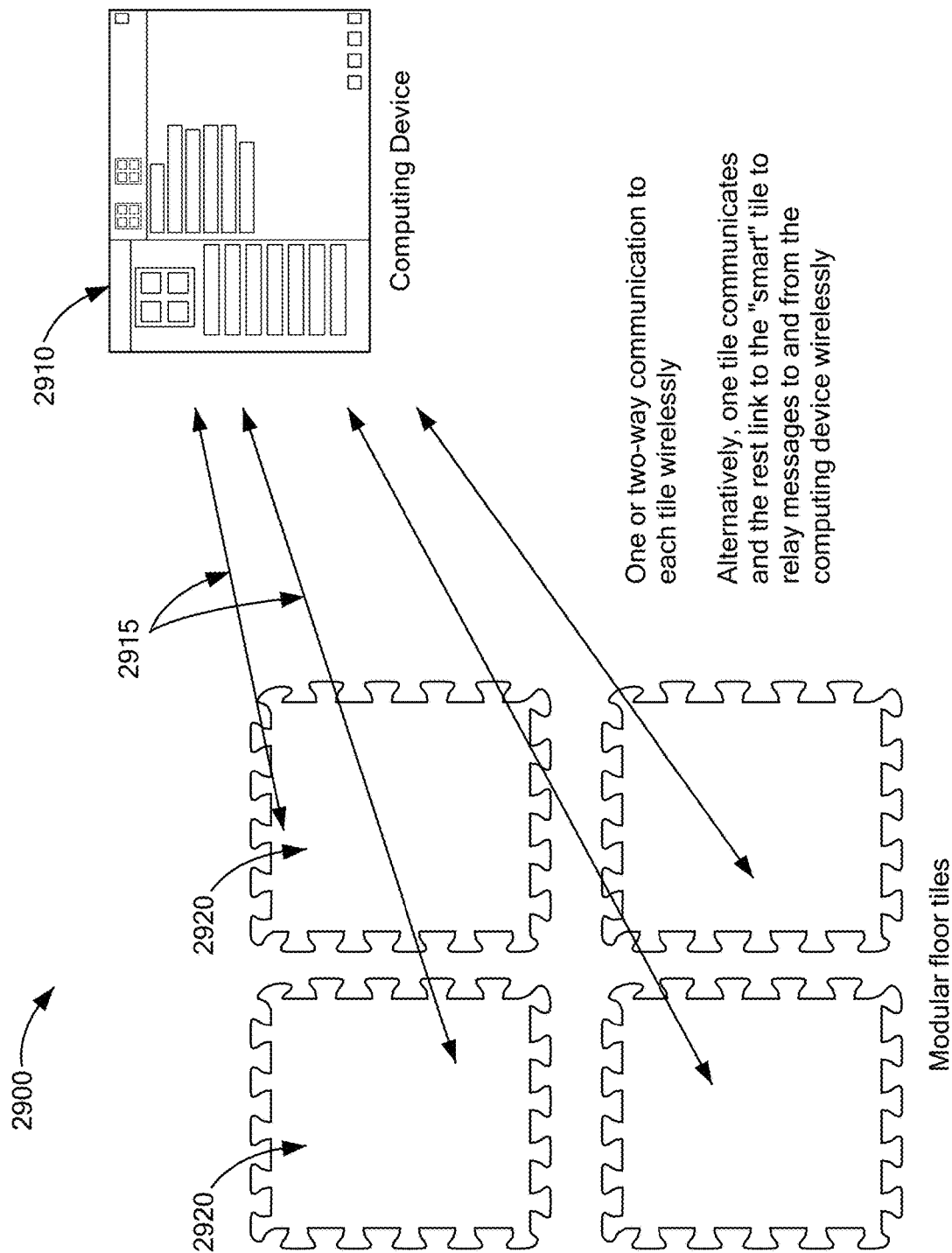
FIG. 29 illustrates a communication system between interconnected tiles and a computing device in accordance with an embodiment.

FIG. 29 illustrates a system 2900 where a communication connection 2915 exists between interconnected tiles 2920 and the computing device 2910 in accordance with an embodiment. In this non-limiting embodiment, each modular floor tile 2920 is capable of independent communication with the computer device. In another embodiment, a single "Main" tile 410 may provide a communication bridge between other tiles 420 and the computing device (see FIG. 4).

Figure 30:
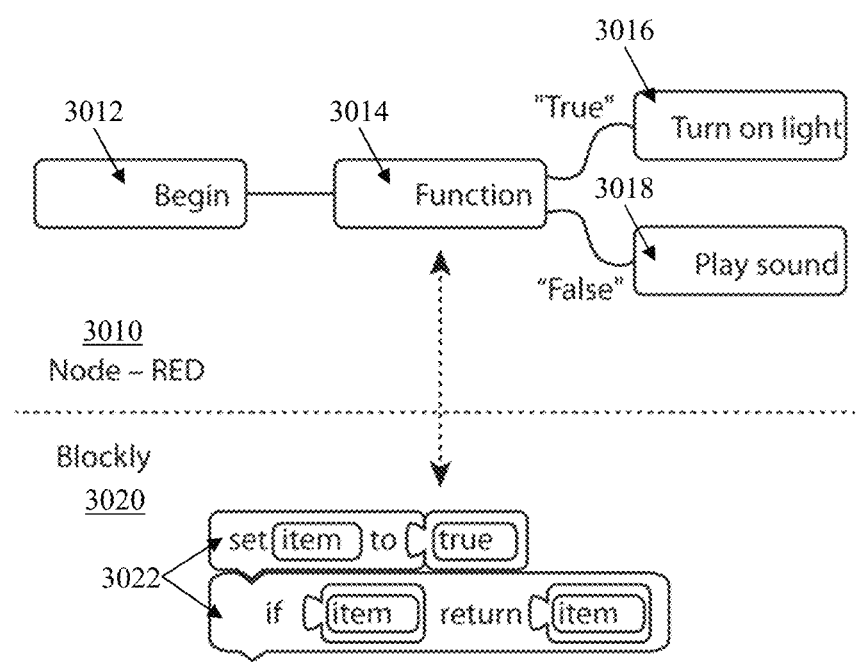
FIG. 30 shows a node programming and block programming sample.

Various embodiments make use of a combination of Node programming language in conjunction with block-programming for functions. FIG. 30 shows a node programming and block programming sample. The Node-Red side 3010 provides one set of instructions beginning on tile 3012. The instruction makes use of a function 3014 to determine whether to perform action 3016 (if "True") or action 3018 (if "False"). The Blockly side 3020 provides a Blockly representation of the same set of instructions using blocks 3022.

Figure 31:
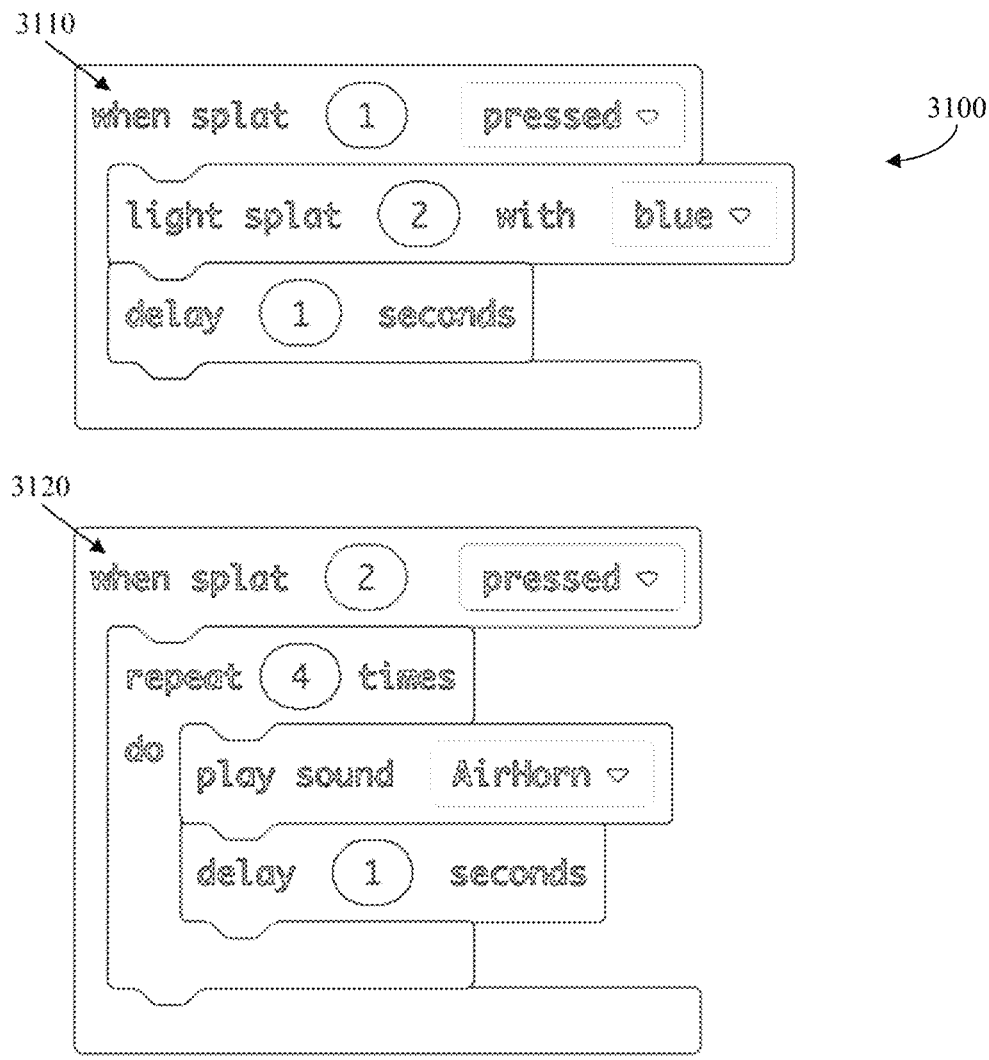
FIG. 31 shows two example block programming instructions.

FIG. 31 shows a sample set of Blockly programming instructions 3100. The first instruction 3110 indicates that when splat 1 is pressed a blue light on splat 2 for a 1 second delay. The second instruction 3120 indicates that when splat 2 is pressed an airhorn sound is played on splat 2 four times for 1 second each.

Figure 32:
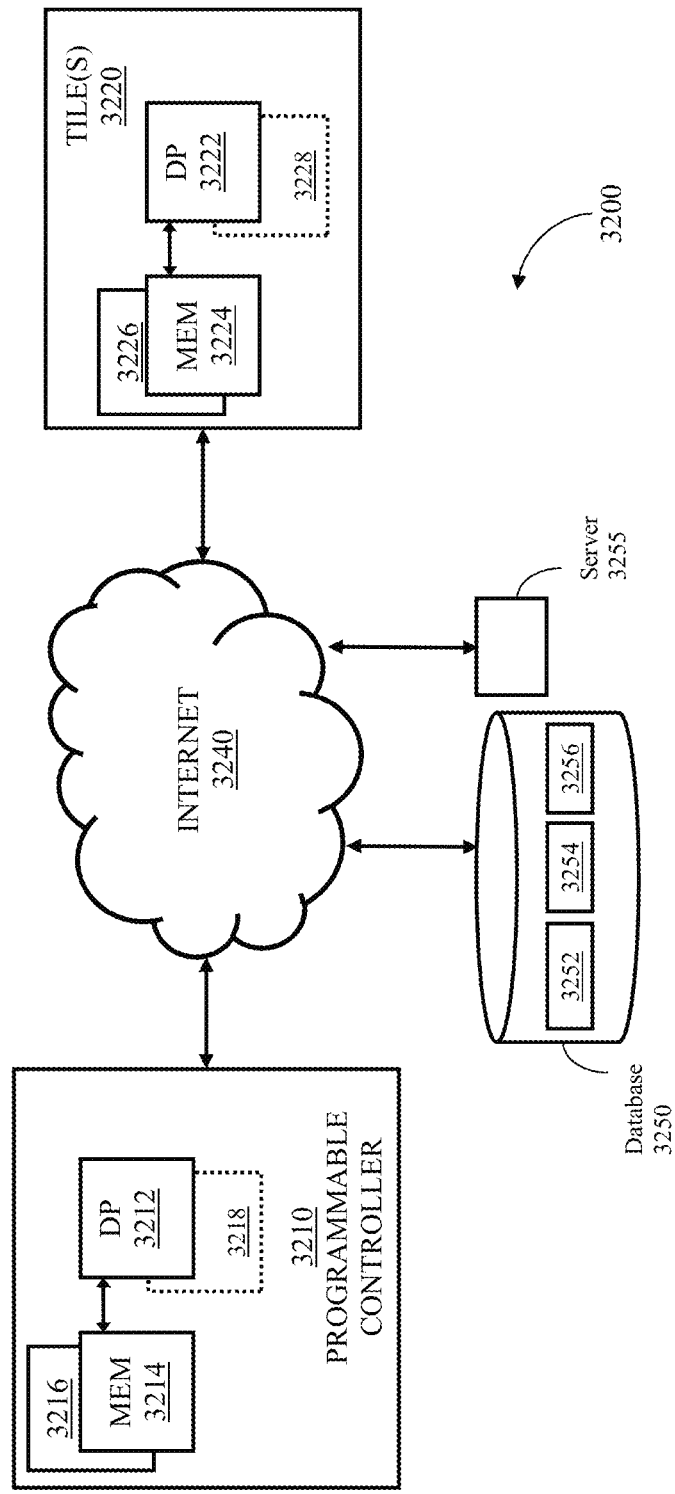
FIG. 32 shows a block diagram of a system that is suitable for use in practicing various embodiments.

FIG. 32 shows a block diagram of a system 3200 that is suitable for use in practicing various embodiments. In the system 3200 the programmable controller 3210 includes a controller, such as a data processor (DP) 3212 and a computer-readable medium embodied as a memory (MEM) 3214 that stores computer instructions, such as a program (PROG) 3216. The programmable controller 3212 may communicate with tile(s) 3220, for example, via the internet 3240 or through a local wireless connection, such as Bluetooth.

The tiles 3220 includes a controller, such as a data processor (DP) 3222 and a computer-readable medium embodied as a memory (MEM) 3224 that stores computer instructions, such as a program (PROG) 3226. The programmable controller 3210 and/or tiles 3220 may also include a dedicated processor, for example an ASIC 3218, 3228. Both the programmable controller 3210 and/or the tiles 3220 may communicate with a server 3255, for example, via the internet 3240 (as shown), and/or via direct communications channels (such as a wireless connection or a physical connection).

Databases may be connected directly to the programmable controller 3210, the server 3255 or the internet 3240. As shown, a database 3250 stores sound data 3252, user data 3254 and tile programs 3256; however, this information may be stored separately (or together) in any of the databases or MEMs 3214, 3224.

The programs 3216, 3226 may include program instructions that, when executed by the DP 3212, 3222, enable the programmable controller 3210 and/or the tiles 3220 to operate in accordance with an embodiment. That is, various embodiments may be carried out at least in part by computer software executable by the DP 3212 of the programmable controller 3210, the DP 3222 of the tiles 3220, by hardware, or by a combination of software and hardware.

In general, various embodiments of the programmable controller 3210 and/or the tiles 3220 may include tablets and computers, as well as other devices that incorporate combinations of such functions.

The MEMs 3214, 3224 and database 3250 may be of any type suitable to the local technical environment and may be implemented using any suitable data storage technology, such as magnetic memory devices, semiconductor-based memory devices, flash memory, optical memory devices, fixed memory and removable memory. The DP may be of any type suitable to the local technical environment, and may include general purpose computers, special purpose computers, microprocessors and multicore processors, as non-limiting examples.

Figure 33:
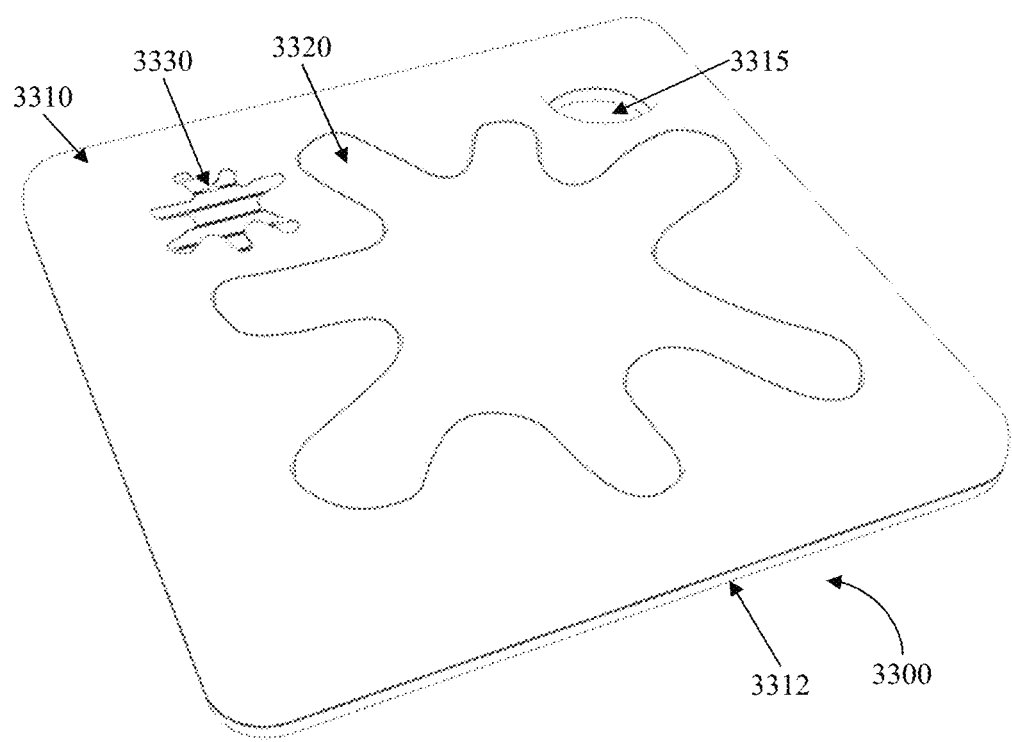
FIG. 33 illustrates a programmable tile that is suitable for use in practicing various embodiments.

FIG. 33 illustrates a programmable tile 3300 that is suitable for use in practicing various embodiments. The tile includes an upper shell 3310 and a lower shell 3312. The shells 3310, 3312 define a hole 3315 which may be used to hold the tile 3300. In this non-limiting embodiment, a splat shaped element 3320 provides a protective cover for illumination elements 3322 (see FIG. 37). The splat 3320 allows light from the illumination elements 3322 to be visible to users. A speaker grate 3330 is also shown having a similar splat shape.

Figure 34:
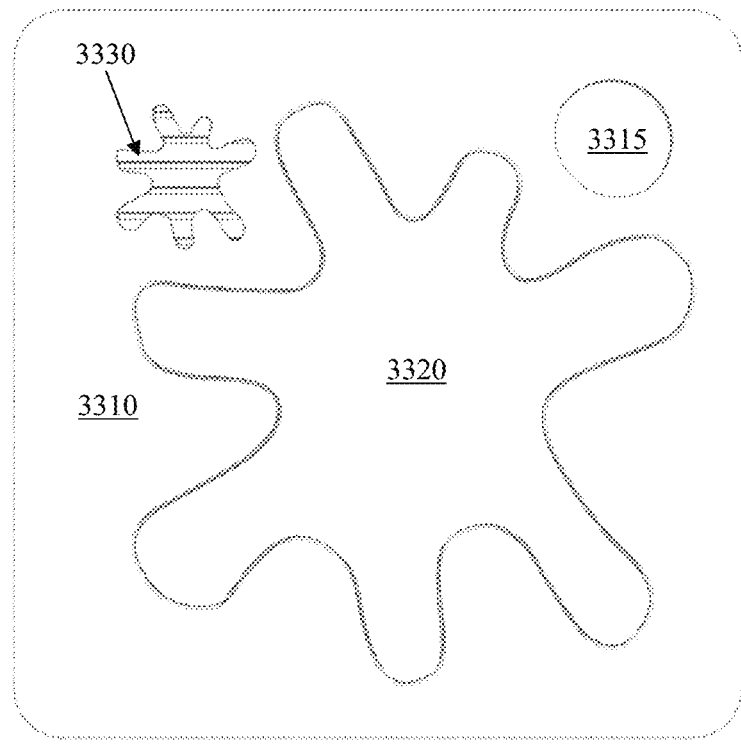
FIG. 34 illustrates a top view of the programmable tile.

FIG. 34 illustrates a top view of the programmable tile 3300.

Figure 35:
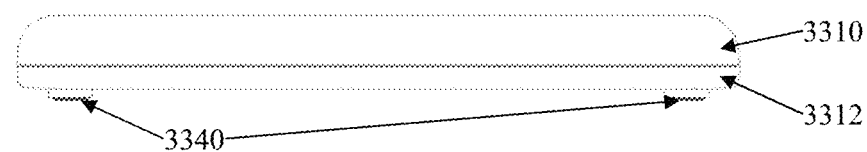
FIG. 35 illustrates a side view of the programmable tile.

FIG. 35 illustrates a side view of the programmable tile 3300. The upper shell 3310 and lower shell 3312 provides a smooth surface. Feet 3340 can also be seen.

Figure 36:
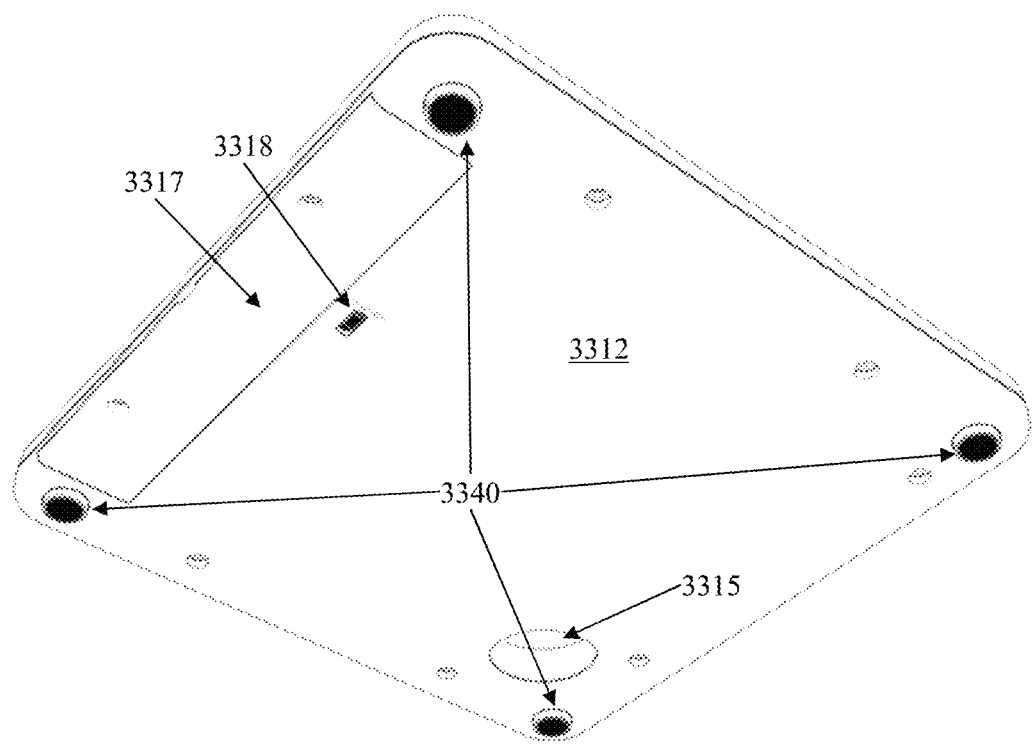
FIG. 36 illustrates a bottom-up view of the programmable tile.

FIG. 36 illustrates a bottom-up view of the programmable tile 3300. The feet 3340 are shown in each corner of the tile 3300. The underside also provides access to a battery cover 3317 and a power switch 3318.

Tiles may also include:
  Sensors: to receive input from the environment (button press, motion, touch, temperature, sound etc.)
  Sensors: to detect motion may include subcomponents to be operated upon by a player, such as a rotatable dial, a toggle switch, etc.
  Output devices: to produce sound, light, information, etc.

Figure 37:
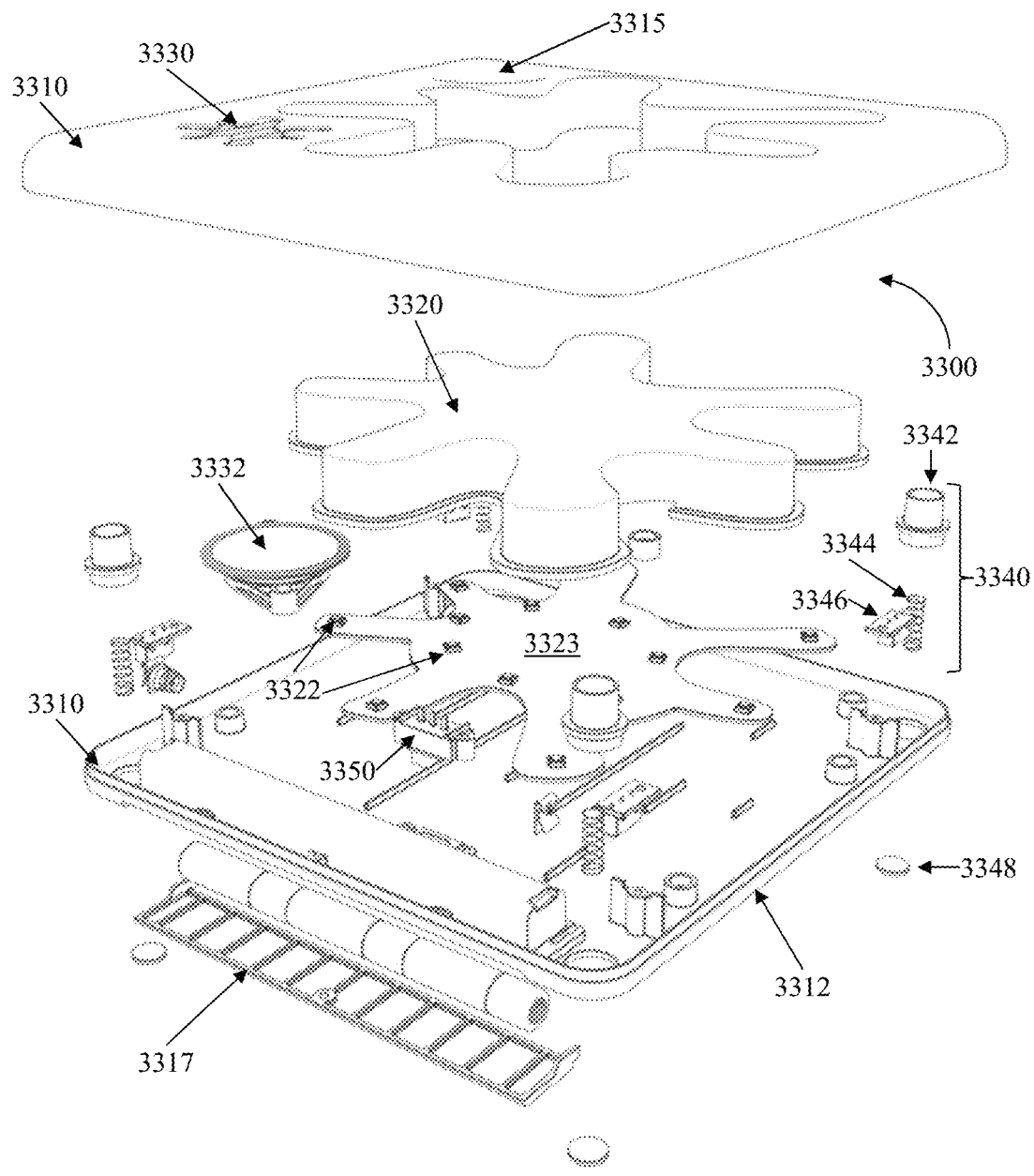
FIG. 37 illustrates an exploded view of the programmable tile.

FIG. 37 illustrates an exploded view of the programmable tile 3300. In this view, speaker 3332, which is located beneath speaker grate 3330, can be seen. Likewise, the illumination elements 3322, shown as LEDs, can be found a supportive element 3323. Supportive element 3323 may also support other electronic elements, such as wireless communication module 3350, other data processors (not shown) and electrical communication paths (not shown) between such electronic elements.

As shown, feet 3340 include a housing 3342 that encloses a spring 3344 which is connected to footpad 3348. A pressure sensor 3346 is also included and provides signals when the foot 3340 detects the tile has been pressed.

Figure 38:
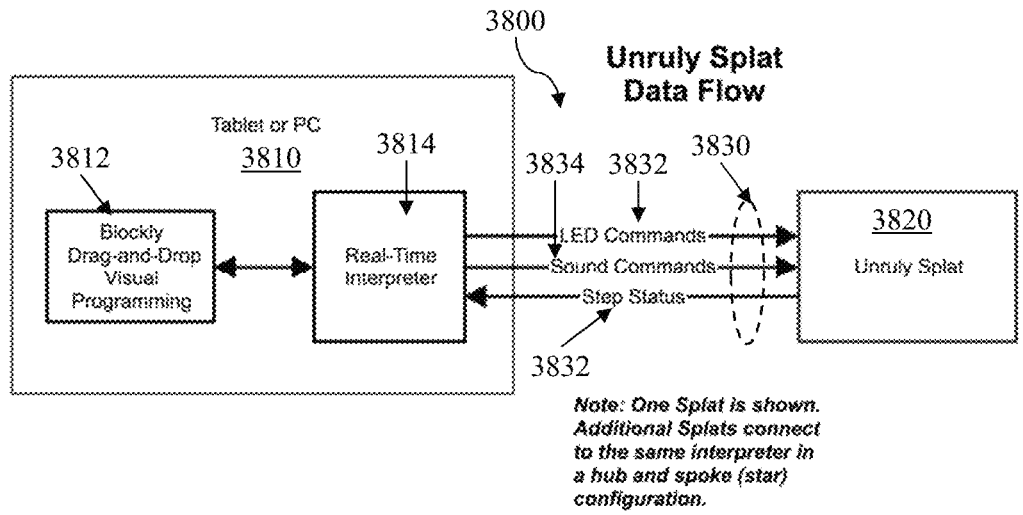
FIG. 38 shows a sample data flow between a controller and a programmable tile in accordance with an embodiment.

FIG. 38 shows a sample data flow between a controller 3810 and a programmable tile 3820 in accordance with an embodiment. The controller 3810 provides a visual programming interface 3812 which is used by the user to create/load a program. An interpreter 3814 then converts the program into commands. Using communication path 3830 (e.g., a wireless connection), the controller 3810 provides LED commands 3832 and sound commands 3834 to a tile 3820. The controller 3810 can also receive step status communications 3832 from the tile 3820 via the communication path 3830.

Figure 39:
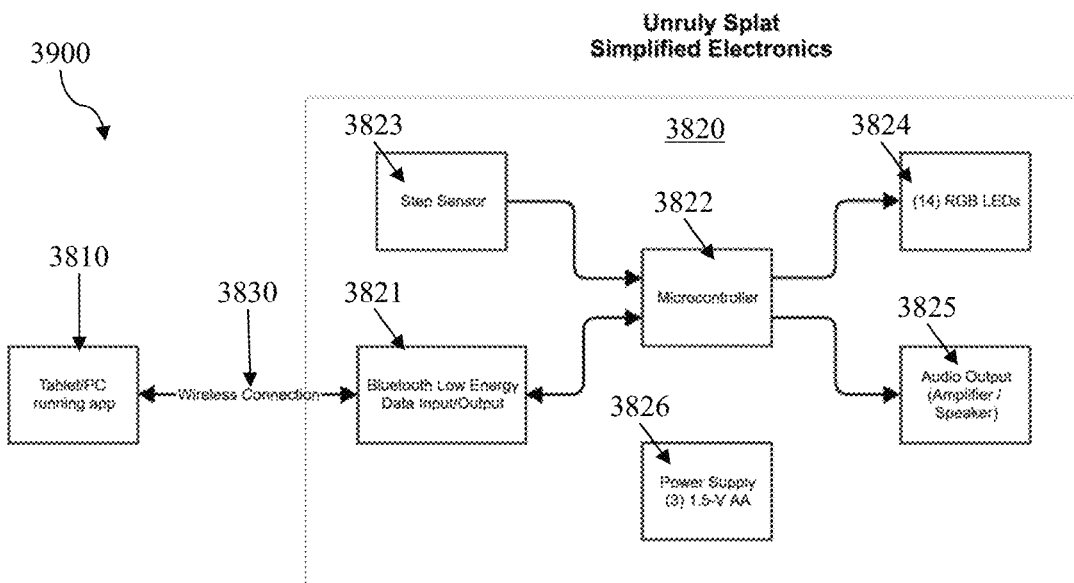
FIG. 39 illustrates a simplified electronics diagram of a programmable tile in accordance with an embodiment.
Figure 40:
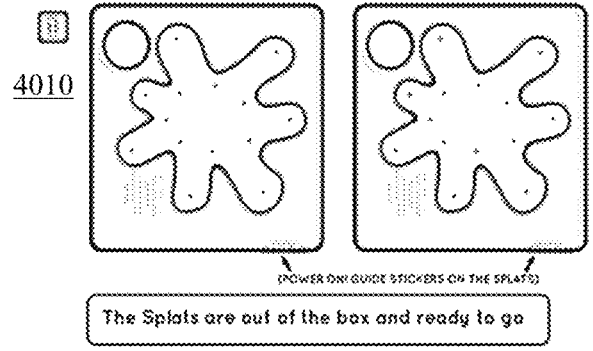
FIG. 40 demonstrates a first portion of a sample method of connecting programmable tiles to a controller in accordance with an embodiment.

FIG. 39 illustrates a simplified electronics diagram 3900 of a programmable tile 3820 in accordance with an embodiment. The tile 3820 is able to communicate with a controller 3810 via a wireless connection 3830. This connection is provided by a data input/output (I/O) module 3821. The tile 3820 provides incoming data to a microcontroller 3822. The microcontroller 3822 can received signals from the step sensor 3823 which it can then relay to the controller 3810 using I/O module 3821. The microcontroller 3822 can also provide instructions to lighting elements 3824, such as LEDs, and to audio output 3825, such as a speaker. The various electronic components of tile 3820 are powered by a power source 3826.

In addition to tiles, the system may include independent sensors. Such sensors or output devices may include cameras, motion sensors, electric eyes, thermal motion sensors, laser detectors, etc. These sensors may then be placed at locations which may not be convenient for a full tile, for example, to be hung on a wall or the ceiling. Likewise, the system may include independent output devices, such as display screens, projectors, smaller buttons, location devices, etc. Additionally, the controller may include sensors and output devices as well, for example, the controller may be a tablet computer with a built-in camera and speaker.

The tiles and/or sensors may use two-way communication with the controller. Thus, they can both receive information/instructions and also send information to the controller (for instance, information that the tile/sensor has been stepped on 11 times). The controller can then react to the information, for example, to keep a counter on the screen (or keep track and count the steps out loud).

Additionally, activating the tiles can cause changes to be shown on a screen. In one, non-limiting example, an adventure story could be shown which tells the user that they have reached a bridge and need to cross it. Having the user run fast back and forth between the tiles/sensor causes the character on the screen to cross the bridge. Having the user jump on a tile can also be used to cause the character to jump on the screen (for example, to jump over a gap in the bridge or an obstacle).

An embodiment provides a system including user-programmable, multi-module floor tiles. Each tile (or grid of tiles) having the ability to emit plural light colors.

In a further embodiment of the system above, the system may include a programmable controller. The programmable controller can be a smartphone, a tablet device, or other computing device. Alternatively, the programmable controller can be a Smart TV or a separate controller that communicates with a computing device.

In another embodiment of the system above, the programmable controller can also run an app which enables a user to program the tiles. The app can enable a user to program the tiles by presenting a modular programming language.

In a further embodiment of the system above, the programmable controller can communicate wirelessly with the tiles. This communication may be one-way, from the controller to the tile, or two-way.

In another embodiment of the system above, the tile modules can be discrete and can be connected together, physically and/or electronically.

In a further embodiment of the system above, connecting modules together enables sharing of power and communication. The communication may be provided using a main tile or via an internet connection.

The tile modules can have sound capability either separately with speakers/buzzers at each tile or through a common/shared device, such as the controller. Sound may also be used as input via a microphone.

Tiles function horizontally and vertically in all orientations. The tiles can be pressed while on any surface. The tiles can be mounted on walls and jumped to or pressed manually. Tiles can be activated by stepping or pressing or sitting on or throwing objects at the tile.

The tiles can be spread out in a large range for (e.g., across a football field or a college campus). As long as the tile is connected to the same network, it can communicate with any tiles anywhere in the world.

Communication works either between one "smart tile" with wireless connection to the computing device and various "sub-tiles" with wireless connection to the "smart tile" or all tiles wirelessly connected to the computational device and to each other (all are "smart"). Alternatively, all tiles are connected to an external "smart remote" that is wirelessly connected to the computational device and acts as the master of all the tiles.

Games can be played over the network from different locations like a remote control.

The tiles can be used as inputs to actions on the computing device or screen. The tiles can simulate any keyboard or mouse or touch screen option.

Tiles can be triggered by various weights. These weights can have a wide range. At the low end, the tile may detect a small ball or item being placed upon it or the weight of an average toddler. The tiles are durable enough to withstand the weight of a large adult (and thus detect such weights). The sensors can be configured the self-adjust for different kinds of play or users.

The sensing can be performed using a pressure sensor, a sound sensor (microphone) or a force sensor (weight). Tile sensors can sense force or weight.

Sensing can work either as on-off (binary/Boolean) or can work as proportional to the amount of pressure put on the tile. Proportional sensing can be used as a programming variable when creating programs.

Each corner of the tile may be associated with a different sensor. Each sensor may be registered separately (as its own input) or as a combination (e.g., all four at once, at least two registering, etc.). Tiles can sense by quadrants or other internal divisions (printed conductive patterns).

Programs can be stored and re-loaded later by a user and programs can be shared with and among other users.

Tiles can show a moving light pattern within a single tile or across multiple tiles. Tiles can be lit from below, the side or the top.

Tiles can be combined with a video sensor (such as Microsoft Kinect) as an addition to a movement game on the screen in order to add spot points that can be reached.

Figure 41:
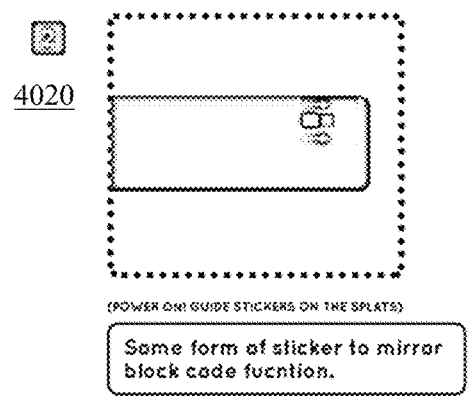
FIG. 41 demonstrates a second portion of the sample method of connecting programmable tiles to the controller.
Figure 42:
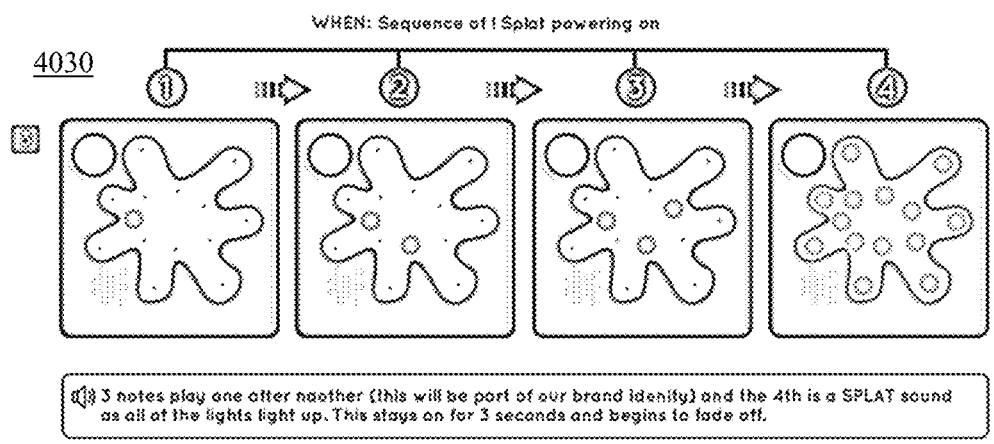
FIG. 42 demonstrates a third portion of the sample method of connecting programmable tiles to the controller.
Figure 43:
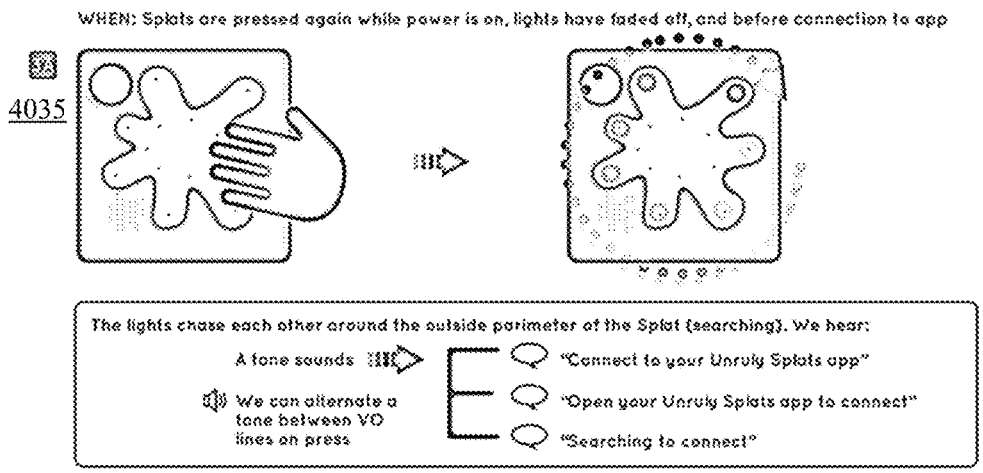
FIG. 43 demonstrates a further aspect of the third portion of the sample method of connecting programmable tiles to the controller.

FIGS. 40-49 demonstrate a sample method of connecting programmable tiles to a controller in accordance with an embodiment. In method portion 4010, shown in FIG. 40, the tiles are unboxed. Method portion 4020, shown in FIG. 41, illustrates the location of a tile identification sticker, e.g., a bar code, ID number, etc. Method portion 4030, shown in FIG. 42, includes the sequence of tiles powering up. In method portion 4035, shown in FIG. 43, the tile's illumination and audio output can be used to communicate various statuses.

Figure 44:
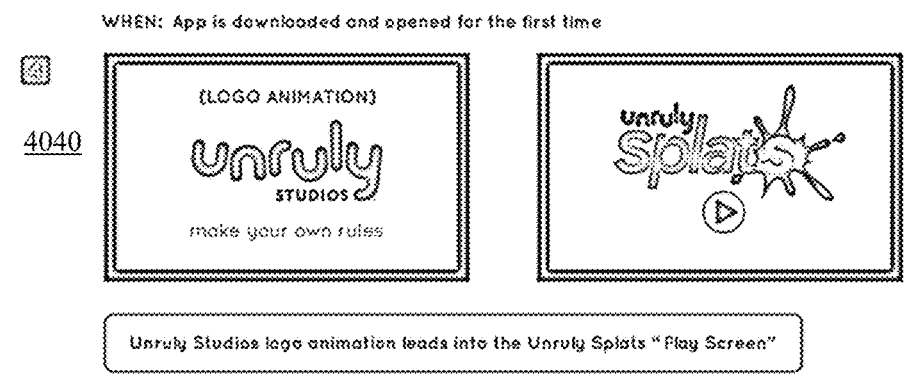
FIG. 44 demonstrates a fourth portion of the sample method of connecting programmable tiles to the controller.
Figure 45:
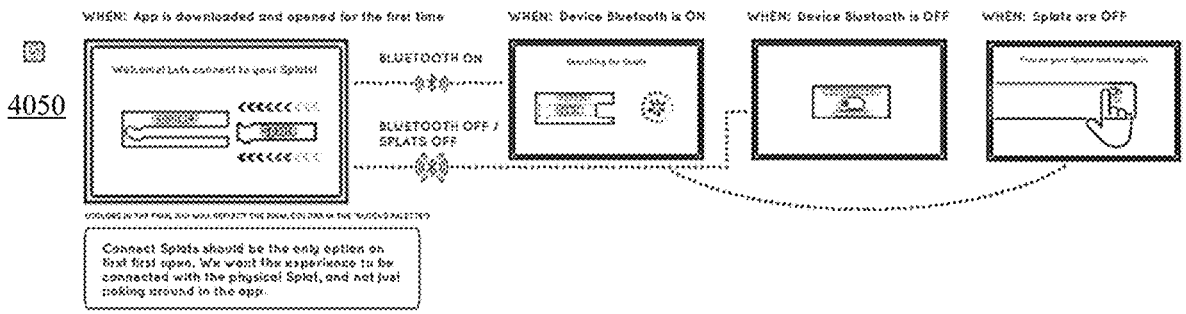
FIG. 45 demonstrates a fifth portion of the sample method of connecting programmable tiles to the controller.
Figure 46:
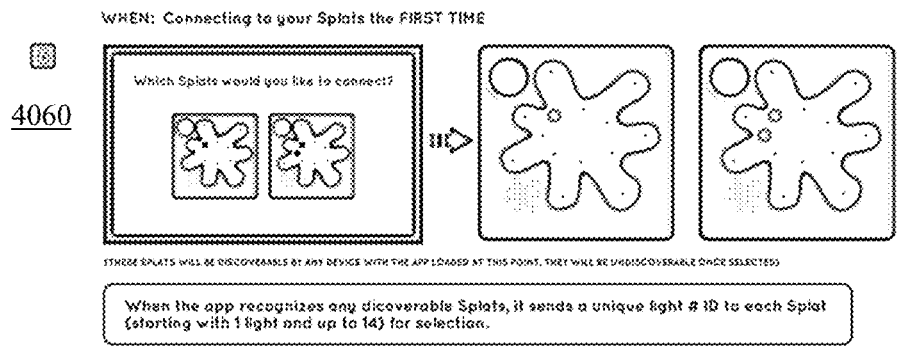
FIG. 46 demonstrates a sixth portion of the sample method of connecting programmable tiles to the controller.
Figure 47:
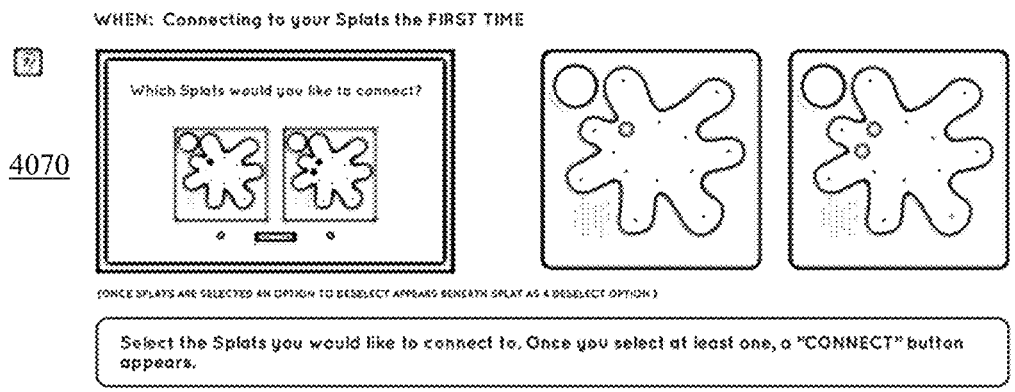
FIG. 47 demonstrates a seventh portion of the sample method of connecting programmable tiles to the controller.
Figure 48:
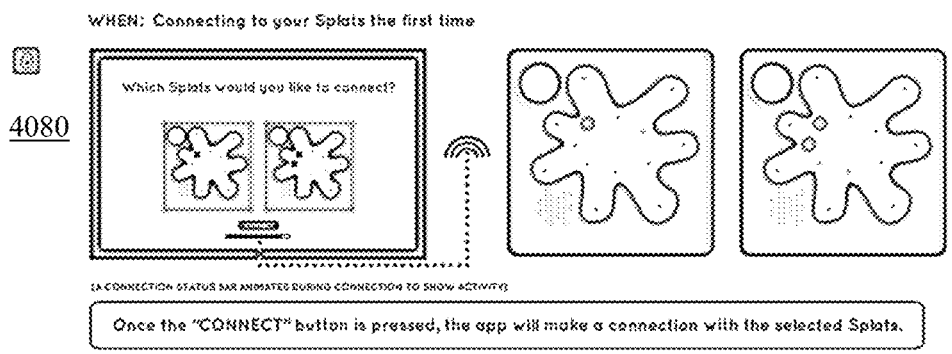
FIG. 48 demonstrates an eighth portion of the sample method of connecting programmable tiles to the controller.
Figure 49:
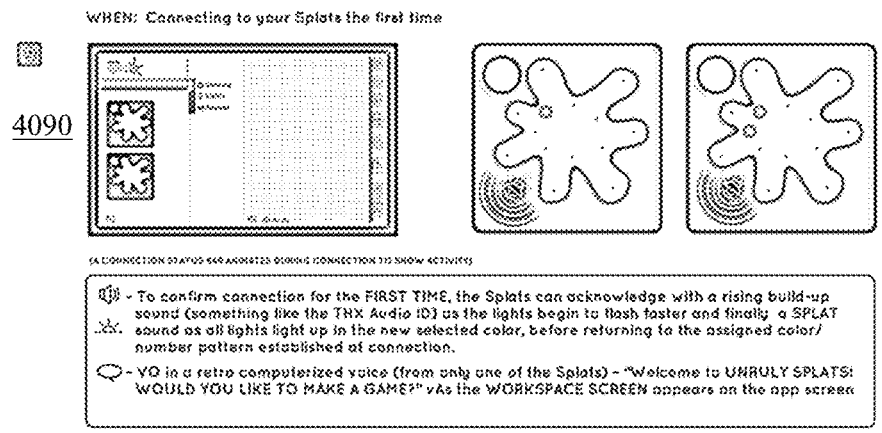
FIG. 49 demonstrates a ninth portion of the sample method of connecting programmable tiles to the controller.

Method portion 4040, shown in FIG. 44, illustrates a start-up animation screen. In method portion 4050, shown in FIG. 45, the application's first-time use process is shown. Method portion 4060, shown in FIG. 46, demonstrates the app recognizing tiles. Method portion 4070, shown in FIG. 47, includes selection of tiles. In method portion 4080, shown in FIG. 48, the user can connect the selected tiles. Finally, in method portion 4090, shown in FIG. 49, the tiles confirm the connection.

Figure 50:
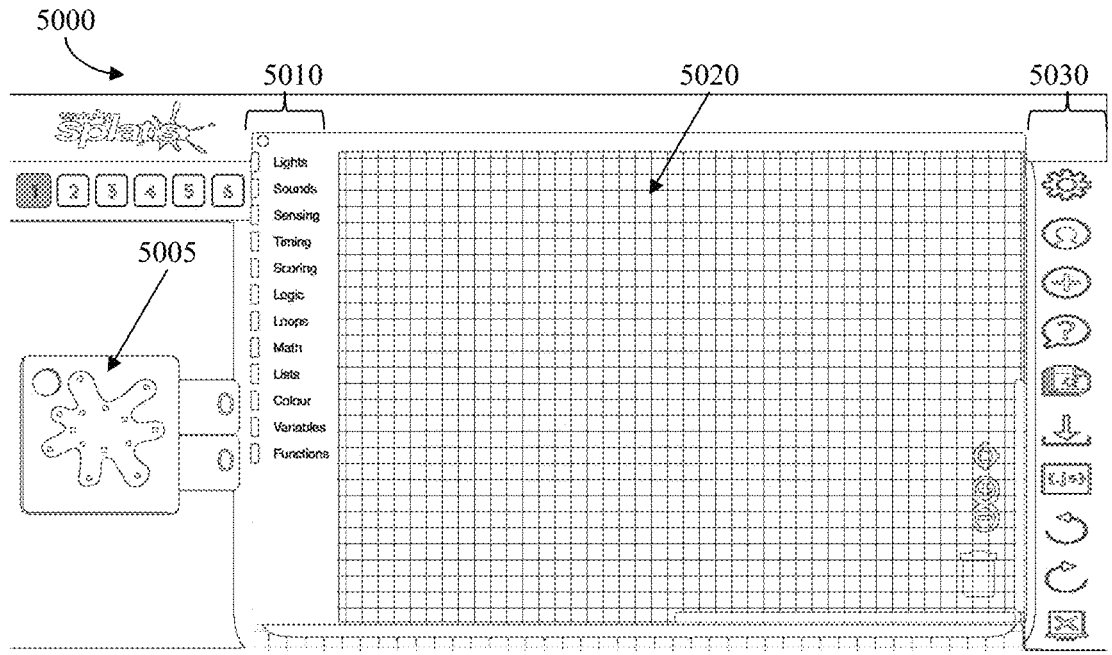
FIG. 50 demonstrates a sample tile programming UI for a single tile in accordance with an embodiment.
Figure 51:
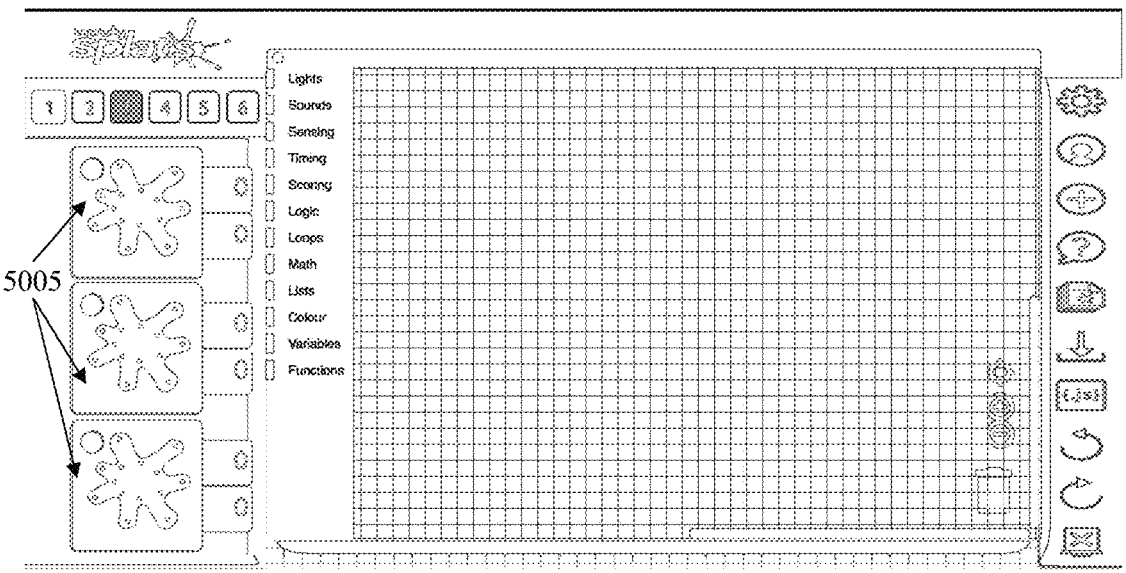
FIG. 51 demonstrates a sample tile programming UI for multiple tiles in accordance with an embodiment.

FIG. 50 demonstrates a sample tile programming UI 5000 for a single tile 5005 in accordance with an embodiment. A Build screen 5020 has a menu of function category options 5010 on the left for different blocks to be used to program tiles. A block is a visual representation of code that tells the tiles what outputs and processes to run. A list 5030 of shortcut commands are shown on the right. Multiple tiles 5005 are shown in FIG. 51 these virtual tiles can also be used to simulate tile functions virtually.

Figure 52:
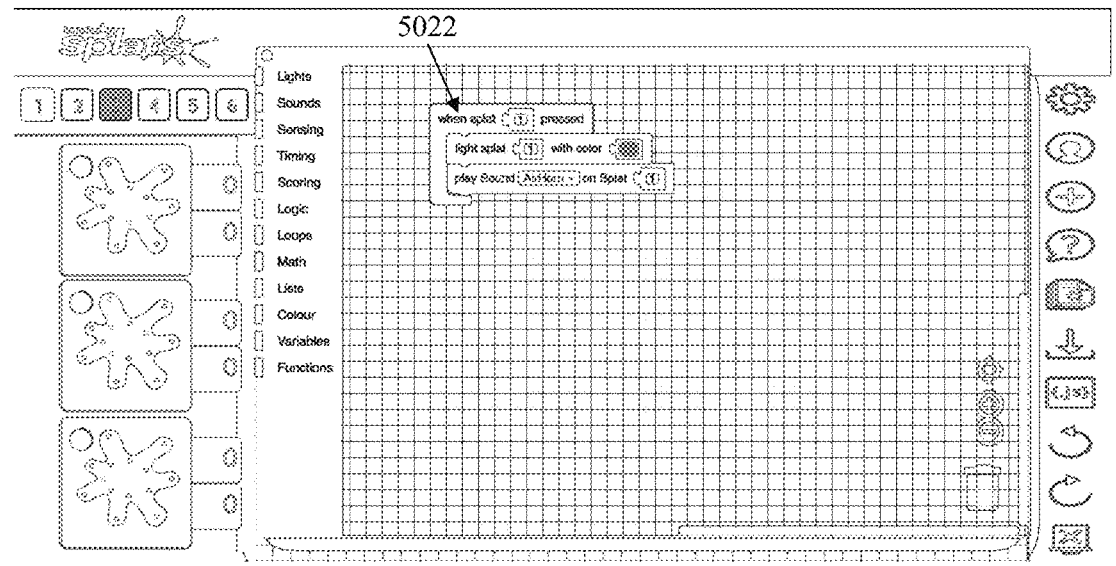
FIG. 52 demonstrates the sample tile programming UI for multiple tiles having a set of instructions.

When a function category 5010 is chosen, blocks appear within each category to translate directions to the tiles for what to light up, what sounds to make, etc. FIG. 52 demonstrates a set of instructions 5022. In a further, non-limiting embodiment, the user may also be provided the option to create their own blocks and/or to select blocks they have previously created.

When creating a program (or at other stages), the user may be presented with recommendations or tutorials. Such comments may be provided via an interface, such as a popup window featuring text, video, animation and/or a character/mascot. The comments may be based on the users actions, such as when starting or selecting a block. The interface may also alert users to when a block has not been fully completed (e.g., when an expected value has not been entered) and/or when a value exceeds a given threshold (e.g., playing an alert sound for too long of a time). Likewise, the interface may alert the user that a block is complete, such as by displaying a check icon, playing a sound and/or closing the interface.

Figure 53:
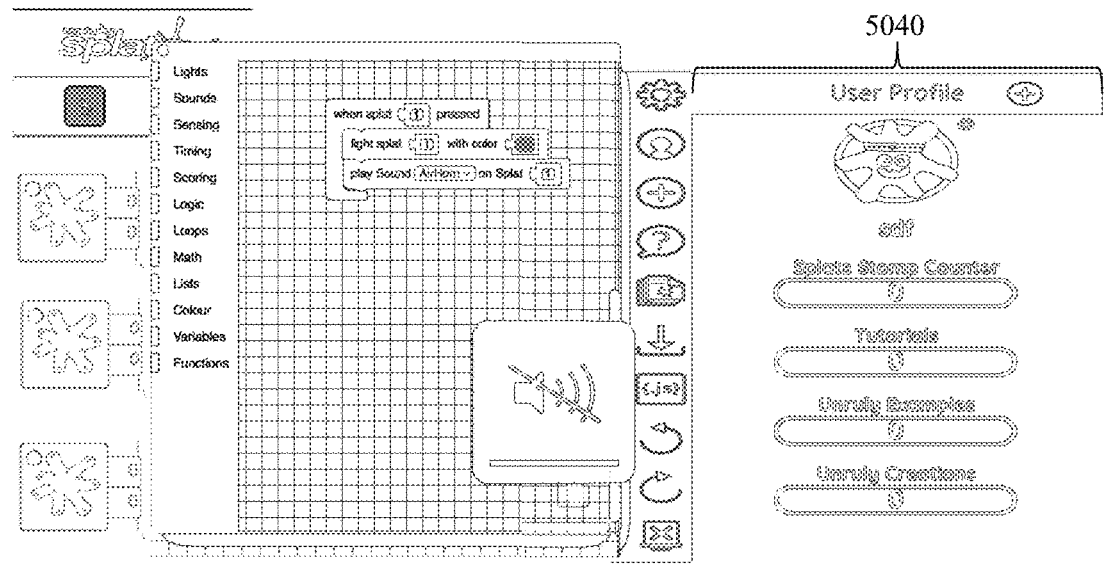
FIG. 53 demonstrates the sample tile programming UI for multiple tiles with a user profile panel.
Figure 54:
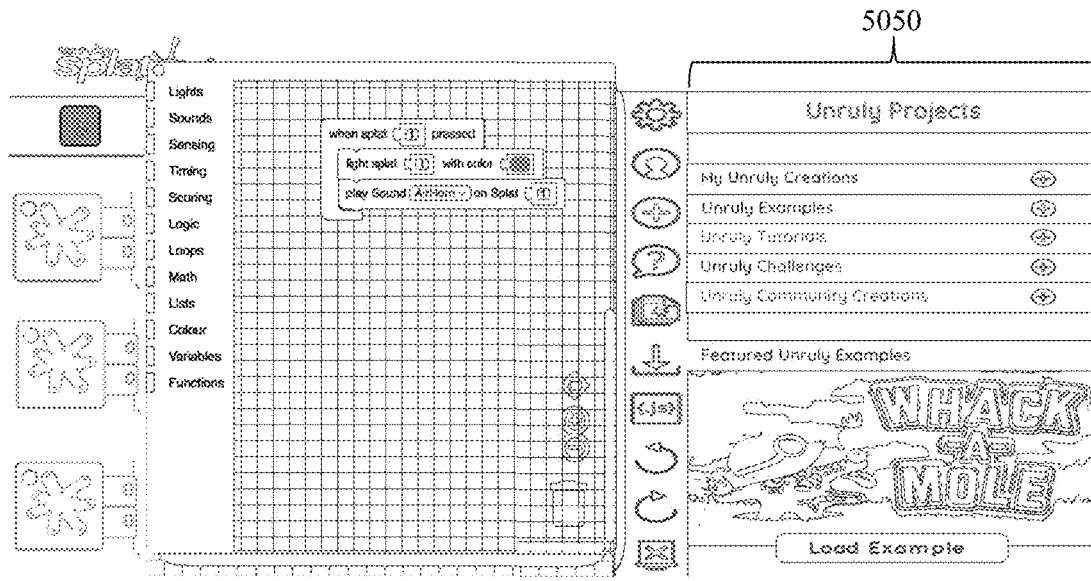
FIG. 54 demonstrates the sample tile programming UI for multiple tiles with a projects panel.
Figure 55:
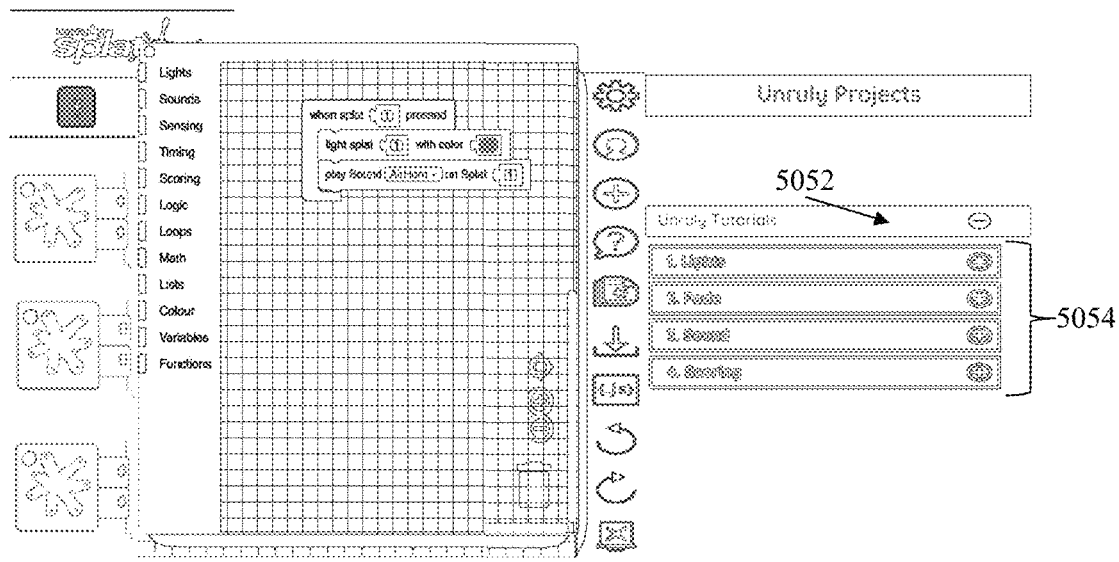
FIG. 55 demonstrates the sample tile programming UI for multiple tiles with a tutorials panel.

A user profile panel 5040 is shown in FIG. 53. Another option includes a projects panel 5050 (FIG. 54). Selecting the tutorials option 5052 presents a list 5054 of tutorials (FIG. 55).

Figure 56:
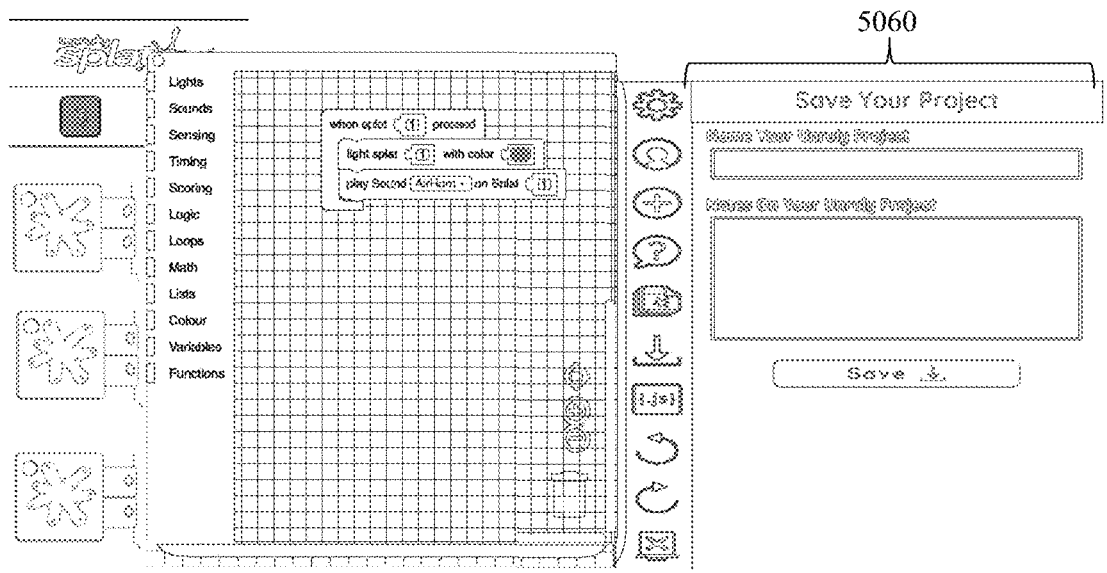
FIG. 56 demonstrates the sample tile programming UI for multiple tiles with a project save panel.

A space to save programs created using the software for later editing and play. FIG. 56 demonstrates a project save panel 5060. This panel can be used to save the current project. The user may provide their own name and their notes.

Figure 57:
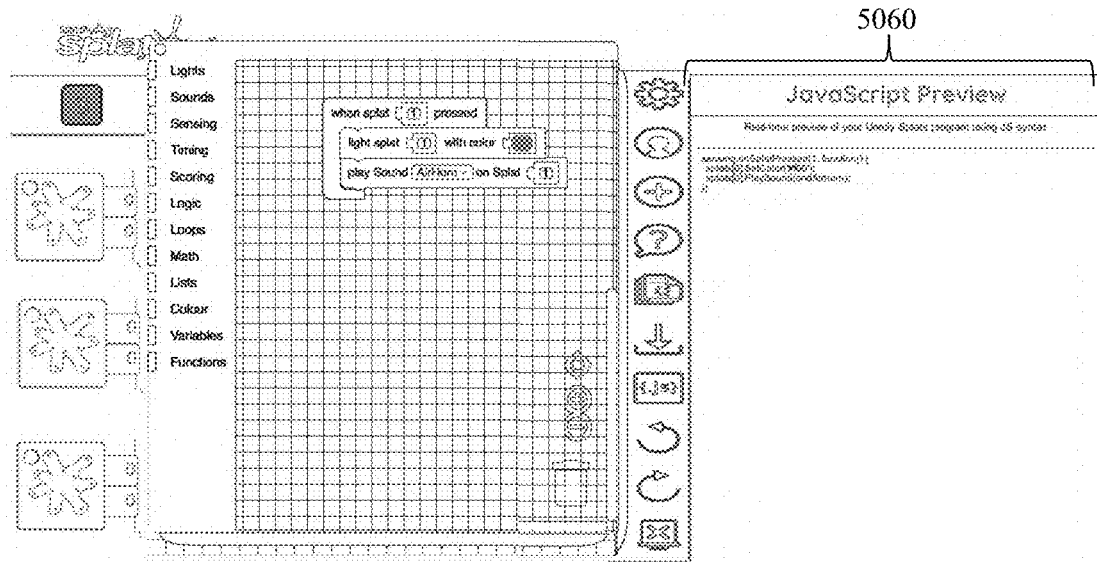
FIG. 57 demonstrates the sample tile programming UI for multiple tiles with a JavaScript preview panel.

FIG. 57 demonstrates a JavaScript preview panel 5060. This preview translates the instructions from build screen 5020 into a JavaScript equivalent. In other embodiments, a different programming language may be used.

Other panels can provide a page of open-ended challenges and ideas to try out new programs and rules to try to add to the tiles to create new experiences in the real-world; or to showcase shared projects by other users. Users can open these files, view source code, and edit code themselves.

Figure 58:
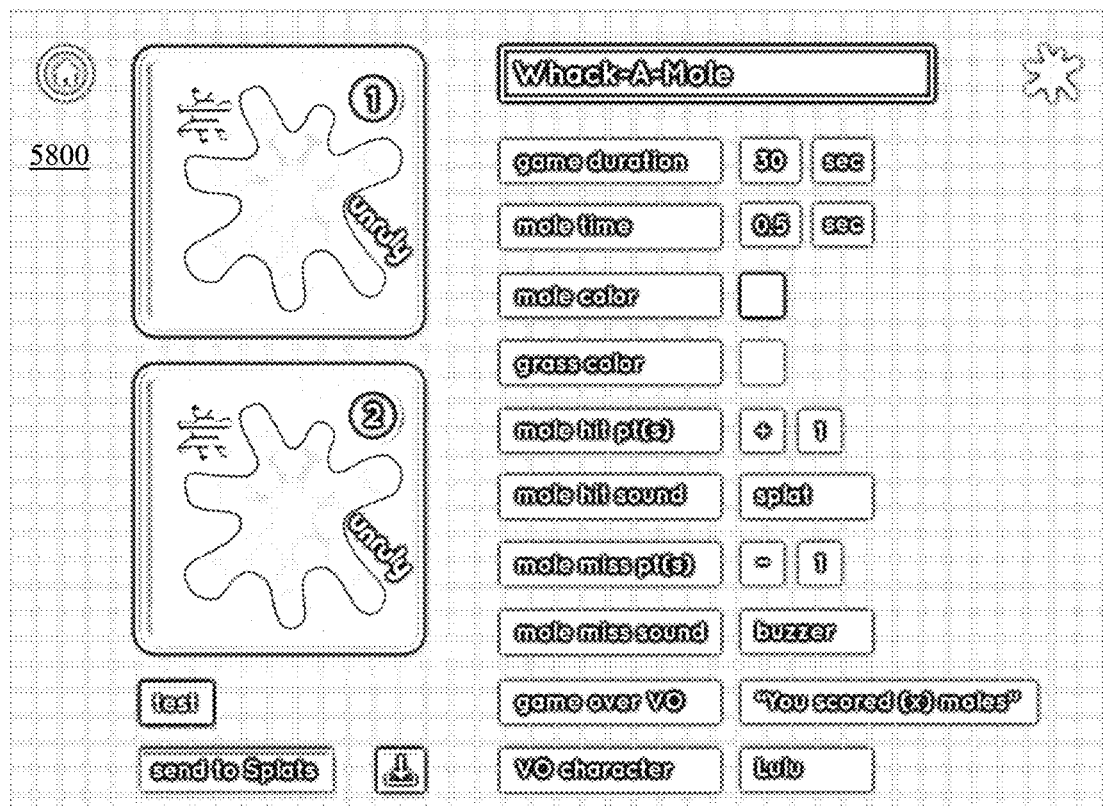
FIG. 58 illustrates a sample program summary display.

FIG. 58 illustrates a sample program summary display. This display may be used during game play or as a summary of a game.

Various operations described are purely exemplary and imply no particular order. Further, the operations can be used in any sequence when appropriate and can be partially used. With the above embodiments in mind, it should be understood that additional embodiments can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared, and otherwise manipulated.

Any of the operations described that form part of the presently disclosed embodiments may be useful machine operations. Various embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium, described below, can be used with computer programs written in accordance with the teachings herein, or it may be more convenient to construct a more specialized apparatus to perform the required operations.

The procedures, processes, and/or modules described herein may be implemented in hardware, software, embodied as a computer-readable medium having program instructions, firmware, or a combination thereof. For example, the functions described herein may be performed by a processor executing program instructions out of a memory or other storage device.

The foregoing description has been directed to particular embodiments. However, other variations and modifications may be made to the described embodiments, with the attainment of some or all of their advantages. Modifications to the above-described systems and methods may be made without departing from the concepts disclosed herein. Accordingly, the invention should not be viewed as limited by the disclosed embodiments. Furthermore, various features of the described embodiments may be used without the corresponding use of other features. Thus, this description should be read as merely illustrative of various principles, and not in limitation of the invention.

What is claimed is:

1. An end user-programmable system of tiles, comprising:
    at least a first end user-programmable tile and a second end user-programmable tile, each of the first tile and the second tile comprising:
        an exterior shell defining a shape having a plurality of corners;
        at least one light;
        at least one speaker;
        a plurality of sensors configured to detect a pressure applied to the exterior shell, each sensor located at a respective corner of the plurality of corners;
        a processor configured to execute program instructions from a program created by an end user; and
        a foot comprising a spring and one or more of the plurality of sensors.

2. The system of claim 1, wherein, for each tile, the exterior shell defines an opening through the exterior shell, the opening configured to be used as a handle.

3. The system of claim 1, wherein, for each tile, the processor is further configured to transmit signals to a remote controller indicating a detection of pressure applied to the exterior shell.

4. The system of claim 1, wherein each tile further comprises at least one of: a radio frequency identity chip reader; a near-field communication receiver; an optical scanner; a microphone; and a temperature sensor.

5. The system of claim 1, wherein, for each tile, one or more sensors of the plurality of sensors is configured to provide a signal indicating an amount of the pressure applied to the exterior shell.

6. The system of claim 1, wherein, for each tile, the processor is configured to receive the program created by the end user from a remote controller.

7. The system of claim 6, wherein, for each tile, the program is created by the end user with the remote controller.

8. The system of claim 1, wherein, for each tile, the at least one light is configured to output a first color in response to a detection of pressure applied to the exterior shell based on a first end user modification to the program, and configured to output a second color in response to a detection of pressure applied to the exterior shell based on a second end user modification to the program, the second color being different from the first color.

9. The system of claim 1, wherein, for each tile, the processor is configured to send at least one end user-customized light command to the at least one light based on an end user modification to the program.

10. The system of claim 9, wherein, for each tile, the at least one speaker is configured to output a first sound in response to a detection of pressure applied to the exterior shell based on a first end user modification to the program, and configured to output a second sound in response to a detection of pressure applied to the exterior shell based on a second end user modification to the program, the second sound being different from the first sound.

11. The system of claim 9, wherein, for each tile, the processor is configured to send at least one end user-customized audio command to the at least one speaker based on an end user modification to the program.

12. The system of claim 1, wherein, for each tile, the at least one light comprises a plurality of lights.

13. The system of claim 1, wherein, for each tile, the foot passes through at least a portion of the exterior shell.

14. The system of claim 1, wherein, for each tile, each processor is further configured to record information about interactions between a player and the tile based on information from the plurality of sensors, and wherein, for each tile, the program is modifiable by the end user to permit the end user to access the information recorded about interactions between the player and the tile.

15. The system of claim 14, wherein the information recorded about interactions between the player and the tile includes a number of times the plurality of sensors has detected pressure applied to the exterior shell.

16. The system of claim 14, further comprising a web-based application configured to allow the end user of the first tile to access the information recorded by the second tile while the first tile is at a first geographic location and the second tile is at a second geographic location.

17. The system of claim 1, further comprising a web-based application configured to allow the second tile to execute program instructions from a program created by the end user of the first tile while the first tile is at a first geographic location and the second tile is at a second geographic location.

18. The system of claim 1, wherein each sensor is separately coupled to the processor to detect pressure applied to the respective corner.

19. The system of claim 1, wherein the plurality of sensors is collectively configured to detect a pressure applied anywhere across the external shell.

20. The system of claim 1, wherein each foot further comprises a footpad.

21. The system of claim 1, wherein each sensor of the plurality of sensors comprises a mechanical switch.

* * * * *